United States Patent
Bortolussi et al.

(10) Patent No.: US 11,592,310 B2
(45) Date of Patent: Feb. 28, 2023

(54) METHODS OF OBTAINING POINT OF INTEREST DATA

(71) Applicant: TomTom Navigation B.V., Amsterdam (NL)

(72) Inventors: Alessandro Bortolussi, Amsterdam (NL); Caspar Van Der Heiden, Amsterdam (NL); Vojin Radosavljevic, Amsterdam (NL); Wouter Van Heeswijk, Helmond (NL); Rinder Hortulanus, Bussum (NL); James Janisse, Veenendaal (NL)

(73) Assignee: TomTom Navigation B.V., Amsterdam (NL)

( * ) Notice: Subject to any disclaimer, the term of this patent is extended or adjusted under 35 U.S.C. 154(b) by 35 days.

(21) Appl. No.: 15/561,987

(22) PCT Filed: Apr. 15, 2016

(86) PCT No.: PCT/EP2016/058382
§ 371 (c)(1),
(2) Date: Sep. 27, 2017

(87) PCT Pub. No.: WO2016/166309
PCT Pub. Date: Oct. 20, 2016

(65) Prior Publication Data
US 2018/0112995 A1    Apr. 26, 2018

(30) Foreign Application Priority Data
Apr. 15, 2015  (GB) ..................... 1506356

(51) Int. Cl.
*G01C 21/34*     (2006.01)
*G01C 21/36*     (2006.01)

(52) U.S. Cl.
CPC ..... *G01C 21/3679* (2013.01); *G01C 21/3476* (2013.01); *G01C 21/3617* (2013.01)

(58) Field of Classification Search
CPC .. G01C 21/3679–3685; G01C 21/3476; G01C 21/3617; G08G 1/096838
See application file for complete search history.

(56) References Cited

U.S. PATENT DOCUMENTS 9,568,331 B1 *  2/2017  Narang ............. G01C 21/3617
2009/0240429 A1  9/2009  Tanaka
(Continued)

FOREIGN PATENT DOCUMENTS

EP  2233887 A1  9/2010
EP  2553396 A1  6/2013
(Continued)

OTHER PUBLICATIONS

Graph API Overview, accessed Mar. 25, 2015, Facebook, https://developers.facebook.com/docs/graph-api/overview (Year: 2015).*
(Continued)

*Primary Examiner* — Spencer D Patton
(74) *Attorney, Agent, or Firm* — Park, Vaughan, Fleming & Dowler LLP

(57) ABSTRACT

A method of generating a personalised recommendation of points of interest (POIs) for a user involves generating a route between an origin and a destination. A search area of a predetermined size is defined for each of a plurality of waypoints along the route. Personalisation data for the user is obtained from one or more social media websites. The POIs present within each search area are identified and descriptive data relating to attributes of each of the identified POIs is obtained. The POIs in each search area are then ranked based on at least a comparison of the personalisation data and the descriptive data relating to the respective POIs.

(Continued)

A subset of the identified POIs is next selected for inclusion in the POI recommendation for each search area based on the determined ranking. A POI recommendation including the selected POIs is then displayed to the user.

21 Claims, 12 Drawing Sheets

(56) References Cited

U.S. PATENT DOCUMENTS

| | | |
|---|---|---|
| 2012/0054035 A1 | 1/2012 | Nam et al. |
| 2012/0197696 A1* | 8/2012 | Beyeler ............... G09B 29/106 705/14.4 |
| 2013/0006516 A1 | 1/2013 | Geurts et al. |
| 2013/0073988 A1 | 3/2013 | Groten et al. |
| 2013/0253831 A1 | 9/2013 | Langendorff |
| 2013/0345958 A1 | 12/2013 | Paek |
| 2015/0112919 A1* | 4/2015 | Weir ................. G01C 21/3476 706/52 |
| 2015/0285652 A1* | 10/2015 | Peri .................... G01C 21/3476 701/438 |

FOREIGN PATENT DOCUMENTS

| | | |
|---|---|---|
| WO | 2009100997 A1 | 8/2009 |
| WO | 2012115646 A1 | 8/2012 |
| WO | 2014083237 A1 | 5/2014 |

OTHER PUBLICATIONS

Graph API User, accessed Apr. 7, 2015, Facebook, https://developers.facebook.com/docs/graph-api/reference/user (Year: 2015).*

Liu et al., Point-of-Interest Recommendation in Location Based Social Networks with Topic and Location Awareness, Mar. 31, 2015, 396-404.

Lyu et al., Using Multi-Criteria Decision Making for Personalized Point-of-Interest Recommendations, Using Multi-Criteria Decision Making for Personalized Point-of-Interest Recommendations, Mar. 3, 2015.

International Search Report dated Jul. 1, 2016 for application No. PCT/EP2016/058382.

Search Report dated Oct. 16, 2015 for GB Application No. 1506356.3.

* cited by examiner

Figure 7

METHODS OF OBTAINING POINT OF INTEREST DATA

CROSS-REFERENCE TO RELATED APPLICATIONS

The present application is a National Stage of International Application No. PCT/EP2016/058382, filed on Apr. 15, 2016, and designating the United States, which claims benefit to United Kingdom Patent Application 1506356.3 filed on Apr. 15, 2015. The entire content of these applications is incorporated herein by reference.

FIELD OF THE INVENTION

The present invention relates to methods and systems of obtaining data relating to points of interest (POI). In particular, the present invention relates to methods and systems for obtaining data indicative of a personalised POI recommendation for a particular user. In preferred embodiments at least, the invention relates to methods and systems for providing a POI recommendation in relation to a generated route through a navigable network. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning functionality, and preferably also navigation functionality.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

One useful function performed by PNDs, or indeed other devices or systems providing route planning functionality, is to provide an indication of the location of Points of Interest (POIs) in the vicinity of a route. A user may then make a decision as to whether to visit one of the POI, if necessary prompting recalculation of the route. Typically systems may display a predefined number of POIs, in some cases per category. The POIs may be selected, for example, based upon distance from the route being followed and/or a general quality ranking for the POIs. However, these types of system do not take into account the differing interests and preferences of different users. POI of certain categories may be of much greater interest to one user than another, and a user may be prepared to travel relatively further from their route to visit a POI of interest to them personally. The general ranking of a POI may not reflect its interest level to someone with a particular niche interest. The Applicant has realised that there remains a need for methods and systems that may provide improved POI recommendations that are personalised for a particular user.

SUMMARY OF THE INVENTION

In accordance with a first aspect of the invention there is provided a method of generating a personalised recommendation of at least one point of interest (POI) for a user, comprising: identifying a plurality of POIs present within a search area;

obtaining descriptive data relating to attributes of each of the identified POIs;

obtaining user personalisation data indicating preferences of the user;

comparing the user personalisation data and the descriptive data for each identified POI in the search area to determine a degree to which the attributes of the respective POI matches the preferences of the user as indicated by the user personalisation data;

ranking the POIs identified in the search area based at least in part upon the determined degree to which each POI is found to match the preferences of the user;

selecting one or more of the identified POIs for inclusion in a personalised POI recommendation for the user based on the determined ranking; and generating a personalised POI recommendation for the user comprising data indicative of the selected one or more identified POIs.

The present invention therefore provides an improved method for generating a personalised POI recommendation for a particular user. POIs for inclusion in the recommendation are obtained by performing searches for POI in relation to one or more specific defined area. For example, in preferred embodiments, multiple search areas are defined associated with different waypoints along a route. In each area the POI present are identified, and ranked using descriptive data relating to the POIs and user personalisation data. The user personalisation data is obtained from one or more external source, such as social media website(s). This allows the provision of the user personalisation data to be decoupled from the POI searching process, and any routing process. A selection of the identified POIs are then included in a personalised POI recommendation for the user. The personalised POI recommendation may then be used to display POI of potential interest to the user in association with a route being traversed, for example. It has been found that the methods of the present invention may allow a more targeted, relevant personalised POI recommendation to be generated for a particular user, in a more efficient manner.

The present invention extends to a system for carrying out a method in accordance with any of the aspects or embodiments of the invention herein described.

Thus, in accordance with a second aspect of the invention there is provided a system for generating a personalised recommendation of at least one point of interest (POI) for a user, comprising:

means for identifying a plurality of POIs present within a search area;

means for obtaining descriptive data relating to attributes of each of the identified POIs;

means for obtaining user personalisation data indicating preferences of the user;

means for comparing the user personalisation data and the descriptive data for each identified POI in the search area to determine a degree to which the attributes of the respective POI matches the preferences of the user as indicated by the user personalisation data;

means for ranking the POIs identified in the search area based at least in part upon the determined degree to which each POI is found to match the preferences of the user;

means for selecting one or more of the identified POIs for inclusion in a personalised POI recommendation for the user based on the determined ranking; and means for generating a personalised POI recommendation for the user comprising data indicative of the selected one or more identified POIs.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

In general, the system of the present invention in any of its embodiments may be at least one processing device. The or a processing device may be a device of a mobile device, such as a navigation device, whether a PND or an integrated device, or of any device having route generating capability, or may be a device of a server, or the system may comprise processing devices associated with both a sever and another device, such as a navigation device.

The steps of the method of the present invention in any of its aspects or embodiments may be carried out by a server, or by a navigation device, or in part by a server and in part by a navigation device. The steps of the method may be performed exclusively on a server, or some on a server and the others on a navigation device in any combination, or exclusively on a navigation device. Thus, the system of the present invention in its further aspects may be provided in part by a navigation device, and in part by a server. The system of the present invention may be a system, e.g. processing device of a navigation device or a server, or may comprises subsystems e.g. processing devices of both a navigation device and a server. However, it will be appreciated that the methods may also be carried out at least in part by any suitable system having route generating capability, but not necessarily navigation functionality. For example, the methods may be implemented at least in part by a computer system, e.g. a desktop or laptop system, which does not have navigation functionality. The methods may be implemented in part by such a system, and in part by a server, or exclusively by such a system.

Where the method is carried out at least in part by a navigation device, the device is a mobile device. The navigation device may be a personal navigation device (PND) or an integrated, e.g. in-vehicle, device, or may be provided by any mobile device having navigation functionality, e.g. by means of an app or similar, and which is not a dedicated navigation device. In accordance with any of the aspects or embodiments of the invention a navigation device may comprise a display for displaying the electronic map to a user, a set of one or more processors configured to access the electronic map data and cause the electronic map to be displayed to a user via the display, and a user interface operable by a user to enable the user to interact with the device.

In accordance with the invention in any of its aspects or embodiments, a search area may be defined in any suitable manner. It will be appreciated that where multiple search areas are defined, any one or more, or each, search area may be defined in any of the manners described. A search area may be of any shape, such as circular or square. The step of defining a search area preferably comprises selecting a point location, and defining the search area based on the selected point location. The search area may be defined in a predetermined manner based on the point location, and generally includes the point location. In preferred embodiments the search area is centred on the point location. The search area may be an area of predetermined radius centred on the point location. Alternatively, the search area may be a square area having sides of a predetermined length centred on the point location.

In some embodiments only a single search area is defined. In these embodiments the search area may or may not be based on a selected point location. For example, the search area may be in the form of an elongate corridor based on a route to be travelled between an origin and a destination through a navigable network. In other embodiments a single search area toward the destination of a route may be used. In preferred embodiments, however, a plurality of search areas are defined, each preferably being based on a respective selected point location. The search areas may or may not then overlap.

In particularly preferred embodiments, each one of the one or more search areas is associated with a route to be travelled between an origin and a destination. The method preferably comprises generating a route through a network of navigable segments between an origin and a destination, and defining the one or more search areas based on the route. The method may comprise obtaining an indication of the origin and the destination. The indication may be provided by means of user input e.g. where the method is performed by a navigation device with which the user interacts, or by a device, such as a computer, having route planning capability. In other embodiments, the indication of the origin and the destination may be received from a remote device, e.g. over the air (OTA). The origin and destination may then be an origin and destination associated with a route through the navigable network that has been generated by, or is to be generated by, the remote device. For example, the origin and destination may be received at a server from a navigation device or other device having route planning capability. In any embodiments in which a route is generated between an origin and a destination, the origin may correspond to a current position of the user.

In some embodiments, a single search area may be defined based on a route, such as a corridor shaped search area extending along at least a portion of, or the entire route. More preferably, the or each search area is based on, e.g. centred on, a reference point location along the route. In particularly preferred embodiments, a plurality of search areas are defined, each being based on a different reference point location along the route. The reference point locations may be selected as desired. The reference point locations may be separated by a predetermined distance along the route. The locations may be regularly spaced. In some embodiments, a predetermined separation of reference points along the route may be selectable by a user, while in other embodiments the predetermined separation may be preset. The size of the areas may be the same or different. The areas may be defined so as to overlap in order to ensure that all parts of the route are covered by at least one search area. As discussed above, in some embodiments each search area is based on, e.g. centred on, a point location and defined by a predetermined size. The predetermined size, e.g. circle of predetermined radius or square with sides of predetermined length, may be preset or may be defined by a user. Where multiple search areas are defined based on reference point locations along a route, the size of each search area may therefore be preset or user defined. In these embodiments, each area is preferably of the same size.

Embodiments in which a plurality of individual search areas are defined are preferred, as this allows the search and/or ranking criteria for the areas to be set independently of one another. For example, temporal criteria used in the search and/or ranking steps may be set differently for different areas, depending upon when the area is expected to be reached during travel along the route, enabling only POI that are relevant, e.g. open, or likely to be of interest at the applicable time to be recommended. In some embodiments, the temporal criteria may be personalised to the preferences of the particular user as described in more detail below.

Where the method of generating the personalised POI recommendation is performed by a server, the method may comprise the server receiving a request for a personalised POI recommendation from a remote device, the request comprising data indicative of an origin, e.g. current position, and destination of a route to be travelled, and optionally data identifying the user for whom the recommendation is intended. The request may also comprise data indicative of settings for defining the one or more search areas, such as a predetermined size of the search areas, and/or a spacing of waypoints along a route at which multiple search areas are to be defined. A request may be received directly or indirectly from the remote device. For example, the request may reach the server via an intermediate system, e.g. server, that may for example determine a user identifier associated with a device identifier for the device for provision to the server.

In embodiments in which the steps of generating the personalised POI recommendation data are carried out by a server, the server may receive the request for a personalised POI recommendation from a remote device, generate a route using the received origin and destination, and define one or more search areas based on the route. The server may then generated the personalised POI recommendation data and transmit the data to the device for output to a user. The server may or may not transmit data indicative of the generated route to the remote device. The device may independently generate the route in relation to its own electronic map. The route may be generated by the remote device before, after and/or during generation of the POI recommendation by the server. In other embodiments, a navigation device may carry out the steps of generating the POI recommendation data and, where applicable, generating a route between an origin and destination upon which the definition of the or each search area may be based.

The method of the invention involves generating data indicative of a personalised recommendation of one or more POIs for a particular user. This is achieved using the personalisation information obtained from the one or more external sources. In order to retrieve the applicable data from the one or more external sources, it is necessary to know the identity of the user. In some embodiments, e.g. where the system performing the method is associated with a device personal to the user, such as a mobile or navigation device, the user identity may already be known to the system. In other embodiments the method may further comprise the step of obtaining data indicative of the identity of a user for whom a personalised POI recommendation is to be generated. The method may comprise receiving such data, e.g. over the air (OTA). The data may be determined directly or indirectly. For example, such information may be transmitted to the system that is to generate the personalised recommendation from a device of the user requesting the information, e.g. as part of a request for the recommendation as described above, or the identity of a user may be determined based upon the identity of the device requesting the information. A single user identity may be associated with multiple devices. However it is obtained, data indicative of the identity of the user is used in identifying personalisation data relating to the user from the one or more external sources.

In accordance with the invention, personalisation data for the particular user is obtained that indicates preferences of the user. In embodiments, the personalisation data for the particular user for whom the POI recommendation is to be provided is obtained from one or more external sources. By an "external source", it is meant that the source is external to the system that performs the steps of the method of generating the POI recommendation data, i.e. which carries out the search or searches for POI in relation to the one or more search areas, and ranks the results thereof using the descriptive data and user personalisation data. In preferred embodiments in which a route is generated between an origin and a destination, and the or each search area is based on the generated route, the source(s) of user personalisation data are external to the routing system. In this way, the user personalisation is obtained from a source which is not part of the system which performs POI searching, and/or which determines navigation data.

The user personalisation data may comprise any form or forms of such data. In embodiments, the or each external source is an Internet source, such as a third party website. The or each external source may be connected to the system which performs the generation of the personalised POI recommendation data via an Internet connection. In some preferred embodiments, the one or more external sources comprise a source or sources of social media data associated with the user. Each external source may be such a social media source. Each external source may therefore be a third party source, e.g. a source associated with a respective social media provider. In some exemplary embodiments, suitable sources of user personalisation data may include any one or more of: Twitter™; Facebook™; and FourSquare™. As will be understood, social media sources are computer implemented tools that allow people to create, share or exchange information, ideas, pictures, videos, etc in virtual communities and networks.

In some embodiments, the user personalisation data is obtained from one or more social media profiles of the user. Where a plurality of external sources are used, the user personalisation data may comprise data may be obtained from multiple social media profiles of the user associated with particular respective social media providers. While data from a single social media profile, e.g. from a single social media provider, may be sufficient for use in the present invention, to provide more comprehensive information about a particular user, it may be useful to obtain data from multiple such profiles associated with different providers. Profiles associated with different providers may focus on different areas, and hence may complement one another to provide a fuller picture of the user's preferences and habits. A social media profile of a user typically comprises information posted by the user to a website hosted by the social media provider, and may additionally comprise information relating to the user obtained by the social media provider, e.g. relating to the movements of the user, and "check-ins" at particular locations. A social media profile of a user may list places, things or events that the user likes. The profile of a user may be associated with profiles of other entities, e.g. companies, organisations, attractions, etc or persons that the user likes, e.g. Facebook™ "likes" or "Friends". The user personalisation data used in accordance with the invention may extend to such profiles associated with the user profile. Social media data therefore may provide a rich source of information as to the habits and preferences of a user. In general, the user personalisation data preferably comprises one or more webpages associated with the user, i.e. associated with a profile of the user, and optionally related profiles.

It will be appreciated that the user personalisation data, when obtained from one or more external sources, is not input to the system by the user, e.g. for use in generating the personalised POI recommendation, routing or navigation, or any other purpose. Thus, the data is preferably not merely data that the user has provided to the system specifically for the purpose of customising POI recommendations, e.g. an indication of categories of POI of interest. Of course, user specified data may additionally be used together with the descriptive data and the personalisation data obtained from the one or more external sources, although in some preferred embodiments such data is not used. It is preferable to be able to decouple all user personalisation information from the routing or POI searching processes.

Whatever its source, e.g. from one or more external sources, the user personalisation data provides data (or information) indicative of the habits and/or preferences of the user. For example, the data may show that the user likes eating at Indian restaurants. The data may reveal temporal preferences and habits of a user. For example, it may be seen that the user likes to eat at Indian restaurants at weekends, but prefers to eat at Italian restaurants during the week. Similarly, it may show a user has a preference for visiting cafes which serve brunch in the mid-morning at weekends. The data may reveal cultural interests of the user, e.g. types of music, heritage, etc that may be of interest. All of this data may help to generate personalised POI recommendations for the user.

It will be appreciated that the step of obtaining the personalisation data for a user may be carried out before, at the same time as, or after the defining the one or more search area, identifying a plurality of POI present within the or each area, and obtaining the descriptive data for the POIs. Provided that the user personalisation data and the descriptive data are available by the time they are required to rank POIs found in the or each search area, the data may be obtained at any stage or stages in the method.

Descriptive data for a given POI may be obtained from more than one source, which may or may not all be external. For example, data obtained from a website may be used together with data obtained from an electronic map. Similarly data in respect of different POIs may be obtained from different sources.

The steps of identifying a plurality of POI present within a search area, obtaining the descriptive data relating to the or each identified POI, and ranking the POIs found in the search area, are performed for the or each search area that is defined. The steps may be carried out sequentially or contemporaneously in respect of multiple areas. The steps performed in relation to any given area may be in accordance with any of the embodiments now discussed.

The plurality of POI identified as being present in a search area preferably corresponds to all POI determined present in the search area, but may be a subset of the POI determined to be present in the search area. For example, POI that are not expected to be applicable e.g. that will be closed, at the time the search area is expected to be traversed, may be omitted. However, the exclusion of such POI may occur instead as part of the ranking process. It will be appreciated that any selection of POI which occurs at the stage of identifying the POIs is additional to the selection which subsequently occurs based at least on the user personalisation data. This initial selection to provide the plurality of POI is not based upon the user personalisation data.

The POI present in a search area may be determined in any suitable manner, using data indicative of the location of POIs in the navigable network. This step may involve using any suitable POI database. The data indicative of POI may be associated with electronic map data. In preferred embodiments the search area is defined in relation to an electronic map, and the plurality of POI are a plurality of POI, e.g. all POI, determined to be present within the search area according to the electronic map data.

The method further comprises obtaining descriptive data relating to attributes of each one of the identified POIs. The descriptive data may be associated with the POIs, such that the descriptive data is obtained when the POI is identified as being present in the search area, or may be obtained subsequently. The descriptive data provides information as to the attributes of a POI, such as its category, facilities or services offered, target users, opening hours, etc. For example, the data may state that the POI is a restaurant offering Thai cuisine at lunchtime and in the evenings, and with a bar open in the evenings. Where the POI is a museum, the data may describe the time periods on which the museum focuses, the type of artefacts, any notable items in the collection, facilities for children, etc. The descriptive data may simply be such data that is typically associated with electronic map data indicative of a POI. Such data will describe at least a category of the POI, and may provide further details, such as opening hours. In contrast to the user personalisation data, the descriptive data relating to the attributes of a POI may therefore be obtained from electronic map data, or other source(s) of data forming part of the system that performs the method of generating the personalised POI recommendation, e.g. of a routing and/or POI search system. However, the present invention may utilise a wide range of types of descriptive data, and does not rely upon the data being in any particular format. To provide greater flexibility, and potentially access to greater amounts of descriptive data, the descriptive data preferably comprises data obtained from one or more external sources. An "external source" in this context is defined in the same way as for the user personalisation data discussed above. The external source is preferably an Internet source, e.g. a third party website. In some preferred embodiments the descriptive data for a given POI comprises one or more webpages relating to the POI. In one exemplary embodiment, such data may be obtained from TripAdvisor™; however numerous other websites may provide such data, e.g. a website associated with the POI itself, a tourist board website.

The method involves using at least the user personalisation data and the descriptive data in respect of each of the identified plurality of POI present in the search area to rank the identified POIs. This step comprises comparing the user personalisation data and the descriptive data for each identified POI to determine the degree to which each POI matches the preferences of the user as indicated by the user personalisation data. The preferences of a user can refer to the tastes, habits, interests and/or likings of the user. The POI are then ranked based at least in part upon the degree to which each POI are found to match the preferences of the user. The higher the degree of matching, the more advantageous the POI is deemed to be, at least in relation to this factor. This may, in general, result in a higher rank of the POI. However, as described below, the ranking of a POI may be based upon other factors in addition to the user personalisation data, which may in some cases conflict with the user personalisation data. The impact of the user personalisation data in the overall ranking of the POI will depend upon the weight assigned to the match of the POI to the user personalisation data in determining the overall ranking of the POI.

Determining the degree to which a POI matches the preferences of a user as indicated by the user personalisation data may be achieved by assessing a similarity between the user personalisation data and the descriptive data for each POI. The method may therefore comprise assessing a similarity between the user personalisation data and the descriptive data for each POI, and ranking the POI based at least in part upon the degree of similarity between the POI and the user personalisation data, preferably wherein the greater the degree of similarity of a POI to the user personalisation data, the higher its rank. The user personalisation data effectively provides a profile for the user, and the descriptive data a profile for the POI. Assessing the similarity between user personalisation data and the descriptive data for a POI typically involves assessing the similarity between text contained in the user personalisation data and the descriptive data, and preferably between keywords contained in the respective sets of data. Where the user personalisation data comprises data obtained from a social media profile for the user, e.g. a Facebook™ page, the text may include entries posted by the user, and text derived from "liked" Facebook™ pages associated with the user profile. Of course, it is envisaged that assessing similarity could be based upon the assessment of non-textual data, such as images. Any suitable technique may be used to compare the sets of data, and assess their similarity. Techniques used in performing web searches are particularly applicable, as web searches typically involve assessing similarity between search terms and different web pages, and ranking the web pages. The present invention may use a wide range of types of user personalisation data and descriptive data, as outlined above. Any data mining techniques known in the art may be used. The user personalisation data and the descriptive data may be analysed in any manner. In order to be able to assess the similarity between the sets of data, it may be necessary to first express the sets of data in comparable formats. This may involve identifying and/or extracting keywords from the data sets for comparison. The keywords may be vectorised to permit comparison, e.g. by determining a cosine similarity between the data sets. Suitable techniques for assessing similarity between the user personalisation data and the POI descriptive data include any known techniques for assessing semantic similarity, such as: manual category and sub-category mapping; automatic category matching, e.g. based on Normalised Google™ Distance, or measures using other search engines; or techniques based on "term frequency-inverse document frequency" (TF-IDF), which is a statistic intended to reflect how important a word is to a document in a collection of documents, such that in general the TF-IDF value increases proportionally to the number of times a word appears in the document, but is offset by the frequency of the word in the collection, which helps to adjust for the fact that some words appear more frequently in general.

The ranking of the POI is based at least in part on the user personalisation data and the descriptive data. In some embodiments, the ranking may be based only on these factors. However, preferably other factors are taken into account. Where multiple factors are taken into account in ranking the POIs, a weight may be assigned to each factor to determine its contribution to the overall ranking. The weights may be preset or user defined, or a combination thereof. It will be appreciated that a POI may be assigned a score in relation to each factor considered, indicative of how advantageous the POI is in relation to that criterion. Typically a higher score may be taken to be more advantageous, although the reverse arrangement may also be used. The scores may then be combined with appropriate weighting to provide an overall score for the POI. The overall scores for the different POIs may then be used to rank the POIs. The step of ranking the identified POIs present in the search area may comprise assigning each POI an overall score including contributions based upon a plurality of factors, including the degree to which the attributes of the POI from the descriptive data for the POI match the preferences of the user as indicated by the user personalisation data, wherein each of the factors is assigned a given weight used to determine its contribution to the overall score. The given weight assigned to a factor may be a variable weight. The method may then comprise ranking the POIs based upon their overall scores.

The ranking of the POI may be based additionally upon any combination of the following additional factors.

Where the search area is associated with a generated route between an origin and a destination, the ranking may take into account a distance between the POI and the route, e.g. the centre of the search area which is preferably a point on the route. Thus, the method may further comprise using data indicative of a distance between each POI and the route to rank the identified POIs present in the search area. The closer the POI to the route, the more advantageous the POI may be deemed to be, at least in relation to this factor. The weight assigned to distance between the POI and the route when ranking the identified POIs may be customised to the user based on the user personalisation data. For example, user personalisation data for different users may reveal that the users are prepared to deviate from a route being traversed to different degrees to reach a POI.

The ranking of a POI may take into account a quality of the POI. Thus, the method may further comprise using data indicative of a quality of each POI in ranking the identified POIs. In general, the higher the quality of a POI, the more advantageous the POI may be deemed to be, at least in relation to this factor. The quality of a POI may be assessed in any suitable manner. The quality may be based upon any data indicative of the quality of a POI, such as a rating of the POI, e.g. a star rating based on visitor reviews, and/or a ranking of the POI, e.g. in a particular region, such as a city. The quality data may be obtained from any suitable source. In preferred embodiments the data is obtained from one or more external sources. Such a source is external to the system performing the method of generating the personalised recommendation, i.e. external to the routing and/or POI search system. The quality data may be obtained from a website, such as TripAdvisor™. The definition of the external source is as defined herein in relation to the source of the user personalisation data. The external source may be the same source that provides the descriptive data for the POIs. In some embodiments the descriptive data may comprise the quality data.

The ranking parameters used in ranking the identified POIs present in the search area may be time dependent. The term "ranking parameters" refer to any parameters used in the ranking process, such as those used to assign a score to the POI in relation to any factor considered, and/or to provide a weight associated with an individual score based on a particular factor for use in obtaining an overall score for the POI. The ranking parameters may be selected such that the ranking of a POI takes into account an applicability of the POI to a relevant time e.g. a time at which the search area including the POI is expected to be traversed. The relevant time may be based on a reference time e.g. a time at which a waypoint upon which the area is defined is to be reached, or may be based upon a more specific assessment of a time at which a route with which the area is associated is expected to pass closest to the POI. Thus a POI, such as a bar, which is likely to be of greater interest in the evening may be assigned a lower ranking if it is likely to be reached in the daytime. A POI that is expected to be closed at the relevant time may be eliminated from inclusion in one or more selected POIs for inclusion in the personalised POI recommendation. In some preferred embodiments the time dependence of the ranking parameters may be customised to the user based upon the user personalisation data. Thus, the user personalisation data may reveal that the user likes to visit cafes serving brunch in the mid-morning. POIs of this type may then be assigned a higher ranking if they are expected to be reached during the morning than if they are expected to be reached during the afternoon.

The method may comprise adjusting the ranking parameters used in ranking the identified POIs present in a search area based on user feedback. The user feedback relates to a previously generated personalised POI recommendation for the user. The feedback may be explicit i.e. initiated by a user. Thus, a user may rate POIs recommended to them. Such ratings may be used to adjust ranking parameters used to generate subsequent personalised POI recommendations. Alternatively or additionally user feedback may be inferred from user behaviour. In embodiments in which the POI are associated with a route to be traversed, the behaviour of the user when traversing the route may be monitored to see whether the user chooses to visit any of the POI, or at least to select an icon indicative of the POI to obtain more information about the POI. The method may comprise adjusting the weight assigned to each of the factors that contributes to an overall score for the POI based on user feedback. For example, feedback may show that a user shows no interest in POI unless they are located very close to a route being travelled. A contribution based on distance from the route may then be adjusted to have greater relative weight than other contributions. The method may comprise obtaining user feedback in relation to the POI included in the generated personalised POI recommendation, and using the feedback in generating a subsequent personalised POI recommendation for the user, e.g. to adjust the ranking parameters used in generating the subsequent recommendation.

In preferred embodiments in which multiple search areas are defined, the present invention allows the ranking parameters to be varied between the different search areas. This is particularly useful where the search areas are based upon different reference points along a generated route. In such cases, the ranking parameters for search areas may be set differently depending upon the distance of the search area from the origin or the destination. For example, where the search area is closer to the destination, certain types or categories of POIs, such as hotels, may be of greater interest than for search areas closer to the origin, and the ranking parameters for such a search area may be adjusted to try to result in a higher ranking for such types or categories of POIs.

In preferred embodiments, different ranking parameters are used to rank identified POIs present in different ones of the search areas. The ranking parameters may be varied based upon one or more of: distance of the search area along the route; and expected time of traversal of the area. The variation in the ranking parameters may be customised to the given user based upon the user personalisation data. Thus, the variation in the ranking parameters based upon distance along the route, or expected time of traversal of the area, may be dependent upon the preferences of a user, as determined from the user personalisation data.

As described above, the step of ranking the identified POIs present in the search area may comprise assigning each POI an overall score including contributions based upon a plurality of factors, wherein each of the factors is assigned a given weight used to determine its contribution to the overall score. Where a plurality of search areas are defined, the weight assigned to one or more particular factors in determining their contribution to the overall score for a POI may be varied between the search areas. Thus, by way of example, where the search area is closer to the destination, a weight ascribed to a factor such as distance from the route may be greater than for a search area in the middle of the route. This reflects that a user may be less inclined to deviate from the route the closer they are to the destination.

Once the identified POIs associated with a given search area have been ranked, one or more of the POIs are selected for inclusion in a personalised POI recommendation for the user. Preferably the one or more POIs selected represent a subset of the plurality of POIs identified. The number of POIs to be selected may be a predetermined number, which may be preset or user specified. It is envisaged that a predetermined number of POIs may be selected per category.

According to the present invention, the method comprises generating data indicative of a personalised POI recommendation for the user, the recommendation comprising data indicative of each POI in the search area selected for inclusion in the personalised POI recommendation. The data indicative of the personalised recommendation of one or more POIs may be of any suitable form that at least identifies the or each POI to be recommended to the user. The data may comprise data indicative of a location of the or each POI, and optionally data indicative of one or more attributes of the or each POI. The data indicative of the or each POI should enable the or each POI to be identified for output to a user, e.g. to be identified in relation to an electronic map, such as may be used by a navigation device or a device having route planning capability. Location data may be by reference to an electronic map, or may be in a map agnostic format, e.g. a set of geographic coordinates such as latitude and longitude, to enable a device receiving the data to determine the location in relation to an electronic map of the device, that may differ from any electronic map used in generating the data. In some embodiments in which the data is generated by a server, the method may further comprise transmitting the data indicative of the personalised recommendation of one or more POIs in the search area to a remote device, e.g. a navigation device, or computer.

Where multiple search areas are defined, sets of one or more POI will be identified in respect of each area for inclusion in a personalised POI recommendation. Data is generated indicative of a personalised POI recommendation including the or each POI selected for inclusion in the recommendation in respect of each such search area. The generated data in respect of the different search areas may be collated into a general set of data indicative of the POIs to be recommended for all areas, i.e. for an entire route, in preferred embodiments, or distinct sets of data may be generated for each search area. Where the defined areas overlap, the same POI may be recommended in relation to two areas (depending upon any variation in ranking parameters between the search areas). Where recommended POI determined in respect of all areas are included in a general set of data, steps may be taken to avoid duplication of POI within the dataset. Data indicative of each POI to be recommended that is included in the generated data may be associated with an indication of the search area to which it relates, although this is not necessary. The definition and use of one or more search areas facilitates the search process, and obtaining relevant POIs, if appropriate using different search criteria for different areas. However, once the POIs to be recommended have been identified, the definition of the search area is not required for use in outputting the recommendation to a user. The user will preferably just see recommended POIs at different positions along a route, and is not concerned with the areas they may be associated with. Thus, in preferred embodiments, a set of data is generated including data indicative of the or each POI selected for inclusion in the personalised POI recommendation in respect of all defined search areas. In some embodiments, an overall ranking of the POIs included in the recommendation in respect of all defined areas may be determined, e.g. based upon overall scores attributed to the POIs, and the generated data may comprise data indicative of the overall ranking of the POIs included in the recommendation. In other embodiments, a certain or maximum number of POIs may be taken from each search area, with the chosen POI from each area being the POI within the respective area with the highest overall scores.

The method may comprise using the generated data to output to the user data indicative of at least some, or preferably each one of the one or more POI identified for recommendation to the user. The method may comprise a device receiving the generated data for use, e.g. from a server. The method may comprise displaying an indication of the at least some, or each of the one or more POI to the user. In embodiments in which the POI have been identified using one or more search areas defined based on a route between an origin and a destination, the method may comprise additionally displaying a representation of the route to the user, and displaying a representation of the or each POI in relation to the route. The or each POI, and where applicable, the representation of a route, may be displayed in relation to an electronic map, e.g. superposed on s representation thereof. At least some, or preferably all of the POIs included in the indication may be displayed to the user. In addition to, or alternatively to displaying the one or more POIs to a user, the step of outputting data indicative of the at least some, or preferably each of the one or more POI may comprise making data indicative of the POI available to the user for storage, e.g. for download to a given device. The user may be able to download such data to a user area for subsequent use by one or more associated devices.

In preferred embodiments, whether generated by the same device, or generated remotely and received by the device, the generated data is used by a device to output to the user data indicative of at least some, or each of the one or more POI identified, and preferably to display a representation of the or each POI in relation to a generated route. The route is preferably generated between the same origin and destination between which a route was generated for use in defining the or each search area used in identifying the one or more POI for recommendation to the user. The device that uses the generated data is preferably a navigation device, although may alternatively be a device that has route planning and not navigation functionality. A navigation device may be arranged to generate navigation instructions to guide the user along the route. While the route in relation to which the POI data is displayed may be the same route previously generated for use in defining the or each search area, e.g. where a navigation device performs the steps to obtain the personalised recommendation data and subsequently also uses the data, in other embodiments the route may not necessarily be the same. In some embodiments, a device may provide data indicative of the origin and destination of a desired route to a server for use in generating the personalised POI recommendation data. The device may independently generate data indicative of a route between the origin and destination before, after or during transmitting the origin and destination to the server, and use personalised POI recommendation data received from the server to output data indicative of one or more POIs associated with the route to a user. The routes generated independently by the server for use in obtaining the personalised POI recommendation, and the device for routing and/or navigation purposes, may or may not be exactly identical. For example, the routes may be determined in relation to different electronic maps, or may not both take into account the same data in respect of current travel and traffic conditions on the navigable network. In yet other embodiments, it is envisaged that data indicative of the route used in obtaining the personalised POI recommendation may be associated with the generated data indicative of the personalised recommendation. This may avoid the need for a device receiving the data to independently generate the route. In any embodiment in which the recommended POI are displayed to a user, the user may then select a displayed POI to obtain more information about the POI and/or to request recalculation of the route to visit the POI as a destination or waypoint.

The term "point of interest" as used herein in relation to the invention in any of its aspects or embodiments takes it usual meaning within the art and thus refers to an object at a particular location, e.g. point or region, that is of interest to a person. A POI may therefore be a building, such as a shop, hotel, restaurant, tourist attraction or the like, or an area such as park.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

The term "segment" as used herein takes its usual meaning in the art. A segment may be a navigable link that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments.

Any of the methods in accordance with the present invention may be implemented at least partially using software, e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a navigation device used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GNSS (Global Navigation Satellite System), such as GPS (Global Positioning System), signal reception and processing functionality. The device may comprise one or more output interfaces by means of which information may be relayed to the user. The output interface(s) may include a speaker for audible output in addition to the visual display. The device may comprise input interfaces including one or more physical buttons to control on/off operation or other features of the device.

In other embodiments, the navigation device may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which:

FIG. 7 is a screenshot of a social media profile 'liked' by a user, such as a Facebook™ page, showing data that may be used to compare it to POI descriptive data;

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
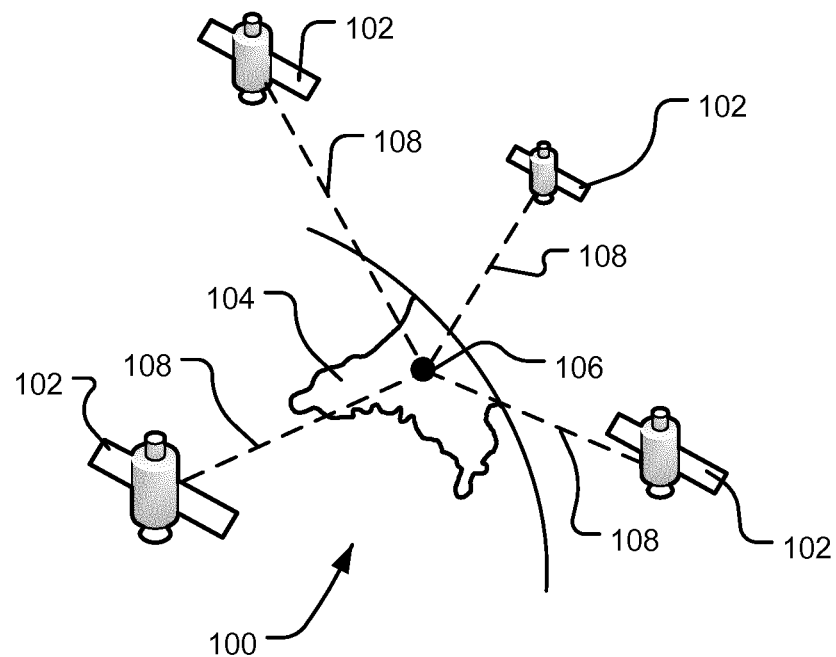
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
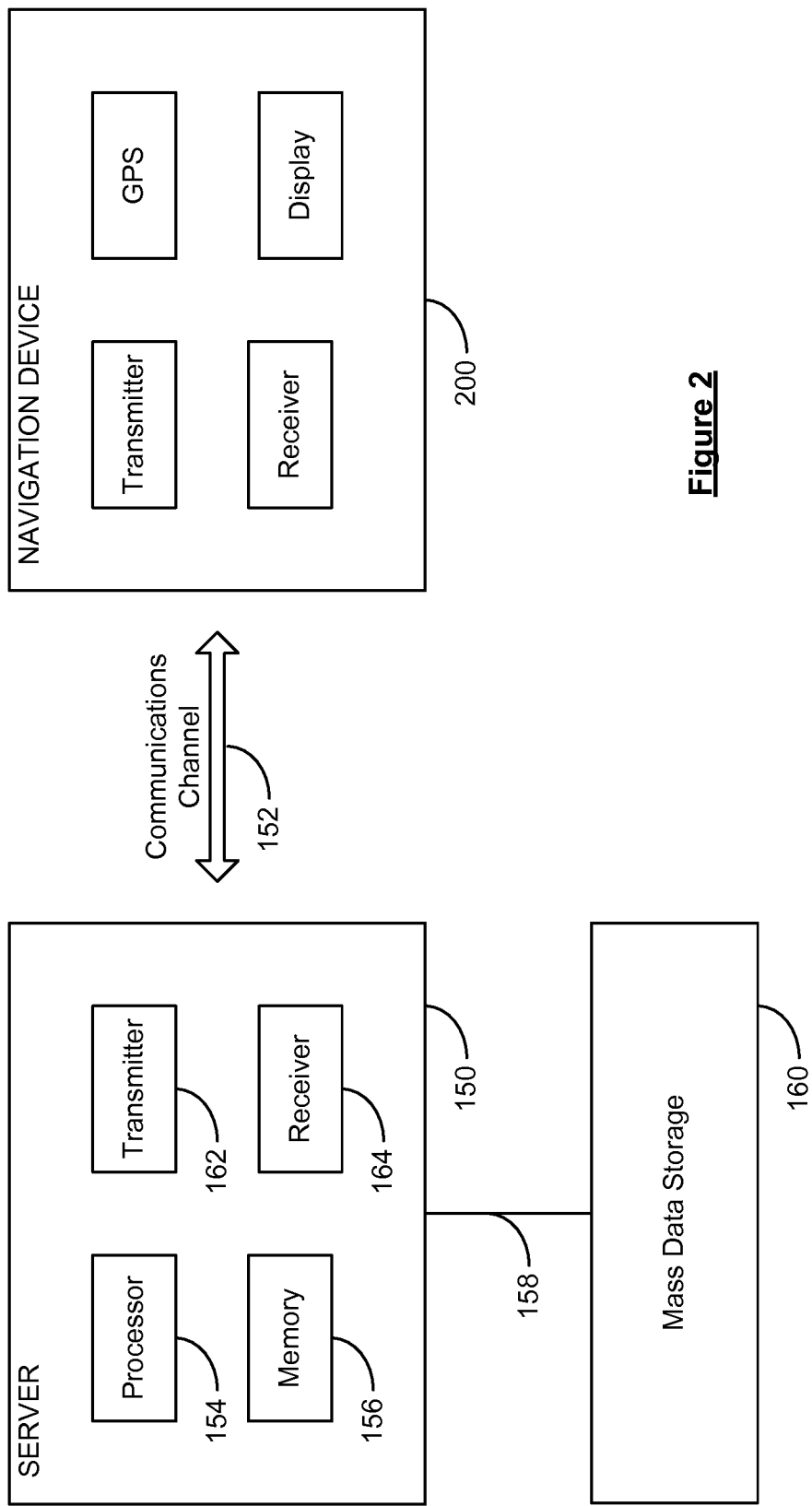
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
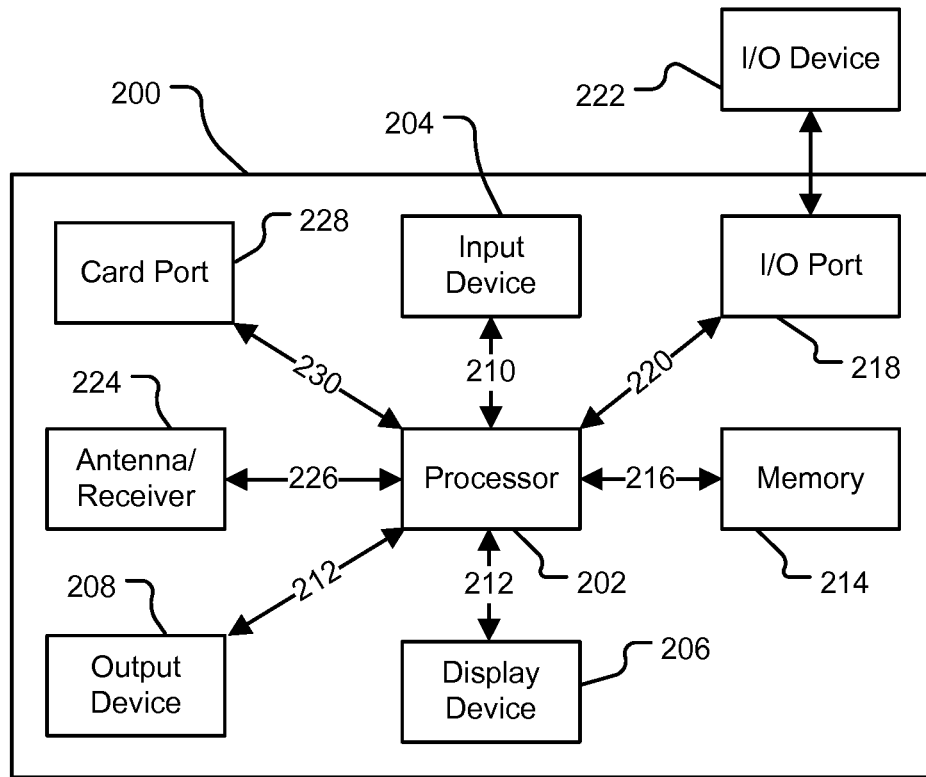
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like). FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
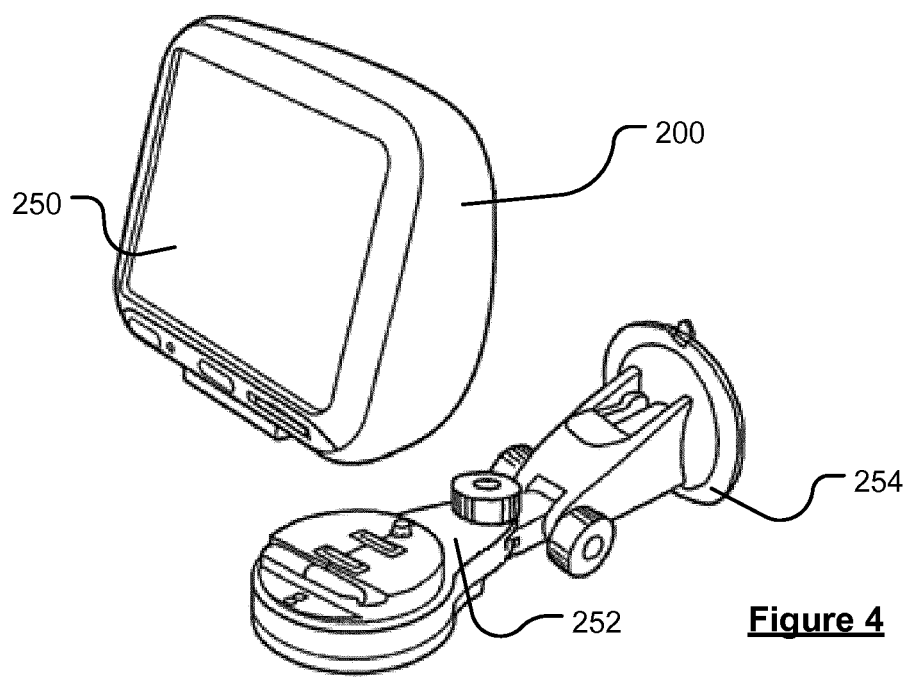
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit. Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to delete the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case. Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts. The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data. As discussed above, the mass data storage 160 also contains map data. Such map data provides information about the location of road segments, points of interest and other such information that is generally found on map.

Figure 5:
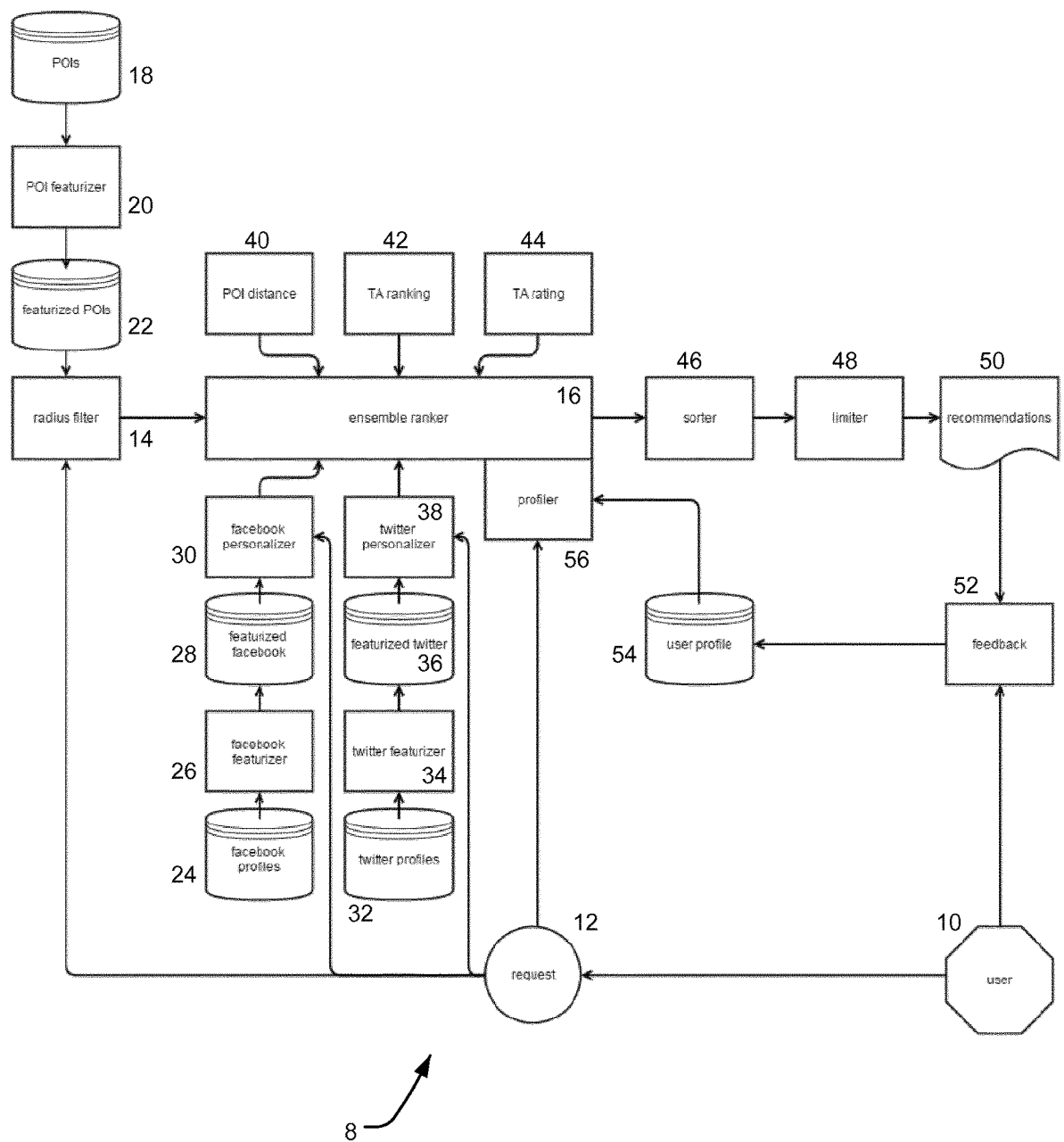
FIG. 5 illustrates one system which may be used to implement embodiments of the present invention.
Figure 6:
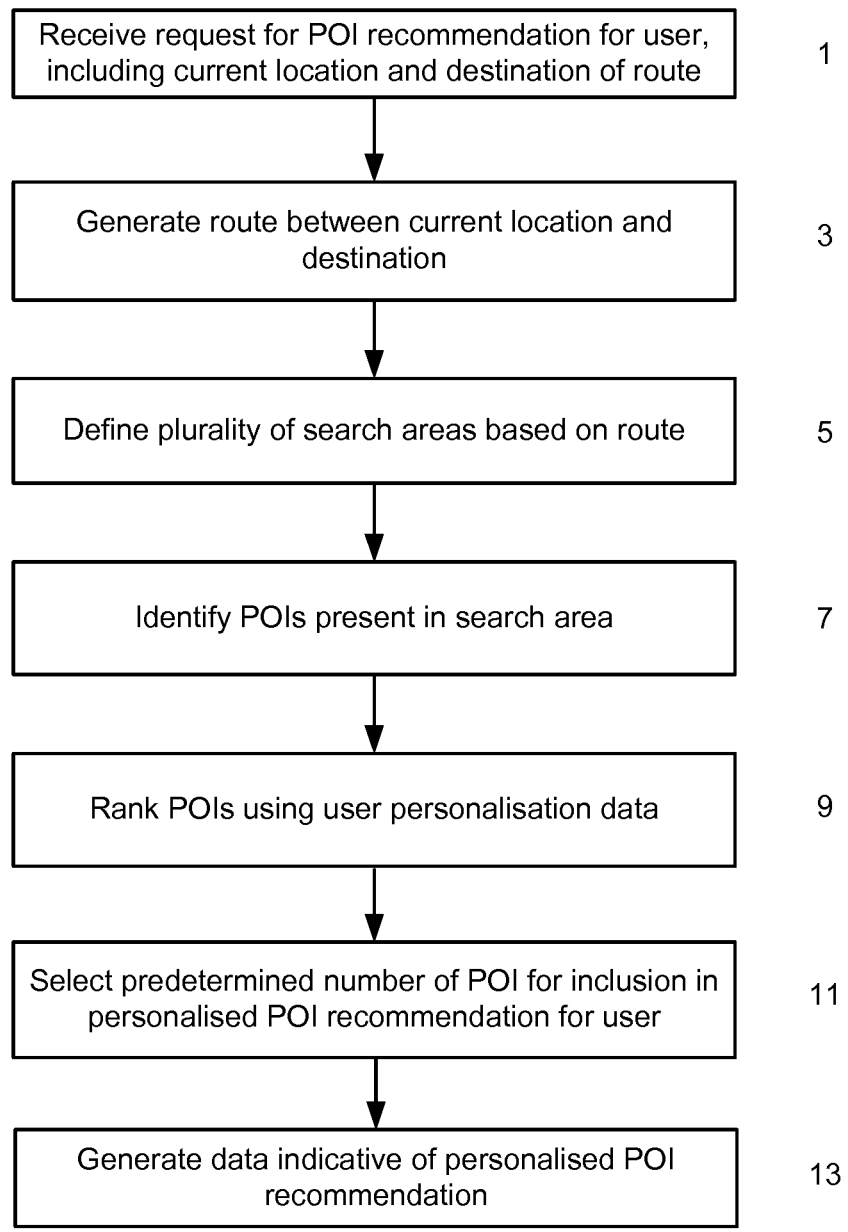
FIG. 6 is a flow chart illustrating the steps of a method in accordance with an embodiment of the invention which may be implemented using the system of FIG. 5.

The present invention relates to methods of providing a personalised recommendation of POI to a user. FIG. 5 illustrates the components of one system 8 that may be used to implement methods in accordance with the invention, and FIG. 6 is a flow chart illustrating the steps of one exemplary method in accordance with the invention which may be performed using the system of FIG. 5. In the exemplary embodiment shown in FIG. 5, the system includes a server, which receives a request 12 for generating a personalised POI recommendation over the air (OTA), and then performs the steps of generating the recommendation. An embodiment of an exemplary overall system including the server, and other exemplary embodiments regarding the architecture of a system implementing the methods of the present invention, will be described by reference to FIG. 12 below.

Referring to FIGS. 5 and 6, in step 1 of the method, the server receives a request 12 for a personalised POI recommendation to be generated in respect of a particular user 10. The request 12 is received from a remote device, and includes an indication of a current location of the user (or any desired origin), and a destination for a route desired to be or being traversed. The request also includes a user identifier. A routing engine of the server (not shown) generates a route between the origin and the destination—step 3. This may be carried out in any conventional manner, taking into account any routing preferences that may be set. The route may be determining using an electronic map representing a navigable network, such as a road network, and applying a minimum cost route algorithm, such as one based on Dijkstra's algorithm, to determine a minimum cost path between nodes of the graph formed by the electronic map as known in the art. In step 5 the server defines a plurality of search areas based on the route. This is achieved by selecting a number of waypoints along the route, being point locations which are spaced at equal intervals, e.g. 1 km. The spacing of the waypoints may be preset, or may be defined by a user. In the latter case, the desired waypoint spacing may be communicated to the server in step 1, together with the request 12. The server then defines a search area in respect of each waypoint, each search area being an area of predetermined size and shape. For example, each search area be a square having sides of length 0.5 km. As with the waypoint spacing, the size of each search area may be preset, or may be user specified (with an indication of the radius then being included in the request 12). The search areas may overlap. While the method is described with reference to a plurality of search areas, it will be understood that the same method can be applied to a single search area.

The operation of the system will now be described in relation to generating a personalised POI recommendation in respect of one of the defined search areas. The same steps are performed in relation to each other defined search area to generate the POI recommendation for the other respective search areas, and hence the complete set of POIs to be recommended for the route. In step 7, the POIs present in the search area are identified. This is performed using the radius filter 14, and the featurized POI database 22. The radius filter allows a set of POIs to be extracted from the featurized POI database 22 which are located within the defined search area. Each POI in the featurized POI database 22 is associated with a description of the POI. In order to allow the POI description to be compared to user personalisation data during ranking of the POI as described below, the POI description has been "featurized", i.e. processed into a format permitting comparison to the user personalisation data. This process will be described in more detail below, by reference to FIGS. 7 and 8. The featurizing of the POI description is carried out by the POI featurizer 20, based on data from the POI database 18, in which the POIs are associated with non-featurized descriptions. The POI database 18 may be of any type containing data indicative of POIs, each being associated with a respective description, such as a database of POIs associated with electronic map data. However, as the description data is featurized to permit comparison to user personalisation data, the POI data can be drawn from a wide range of sources. In some preferred embodiments, the POI data may be taken from an external source, such as a third party website. The data may, for example, be data taken from TripAdvisor™. POI data may be obtained from a variety of sources, both internal and external to the server.

In step 9, the POIs identified as being present in the search area are ranked, taking into account the user personalisation data. Returning to FIG. 5, data indicative of the identified POIs is provided to the "ensemble ranker" 16. This component provides each POI with a score as to how well it matches the various criteria taken into account in the ranking process, which includes consideration of how well the POI matches user preferences determined from user personalisation data. The ensemble ranker 16 is provided with a number of inputs providing data used in scoring the POIs. In this exemplary embodiment, the ensemble ranker 16 receives inputs from two different external sources of user personalisation data, the Facebook™ personalizer 30 and the Twitter™ personalizer 38. The Facebook™ personaliser 30 is in communication with the Facebook™ website to enable it to obtain the Facebook™ profile for the user (and optionally associated profiles) from the Facebook™ profiles 24 found on the website. As with the POI descriptions, the Facebook™ profile of the user (and, if applicable, linked profiles) is featurized using the Facebook™ featurizer 26 to provide featurized Facebook™ data 28, which may be operated on by the Facebook™ personalizer 30. The way in which a Facebook™ profile may be featurized will be described below. However, the featurization of a profile converts at least portions of the profile to a format which permit ready comparison to the featurized POI description of a given POI to assess how well the POI may match the user's preferences as inferred from their Facebook™ profile. In a similar manner, the Twitter™ personalizer 38 receives featurized Twitter™ data relating to the user from the featurized Twitter™ data 36, which has been obtained by operation of Twitter™ featurizer 34 on the user's Twitter™ profile (and if applicable, linked profiles) obtained from Twitter™ profiles 32 on the Twitter™ website. It will be appreciated that rather than obtaining user personalisation data from two external sources, i.e. the third party Facebook™ and Twitter™ websites, data may instead be obtained from only one such source, or may alternatively or additionally be obtained from any other source or sources of social media data, or indeed another source of user personalisation data, which need not be social media based. It is advantageous to obtain the user personalisation data from external sources as shown in the illustrated embodiment, as this allows the data to be decoupled from the routing and POI searching processes and systems.

The way in which the Facebook™ data obtained from Facebook™ personalizer 30 may be used with the featurized POI description data associated with a POI to assess the relevance of the POI to the user will now be described. Operation using data instead taken from the Twitter™ personalizer will be similar. The Facebook™ profile of a user will include text posted by a user, which may reveal the tastes and habits of the user, e.g. what type of restaurant they like, when they tend to visit it etc. The profile will typically also be linked to profiles of other organisations, companies, events, attractions etc. which the user likes. These text associated with these "likes", and, if appropriate, text found within the profiles themselves, may reveal further useful data about the user's tastes and habits, e.g. what type of attraction is of interest to them, what type of food they like. For example, it may be found that the user like to visit museums dealing with natural history, or this may be inferred from the user mentioning natural history related topics in their posts, or including "likes" for natural history TV programmes or events. Where a user "likes" a beer festival, or particular beer producer, it may be inferred that pubs specialising in real ale may be of interest. The user's profile will typically also be associated with the profiles of their "Friends", which may provide further useful information e.g. by consideration of the "likes" of those Friends. Twitter™ data may similarly provide a picture of the user's habits and tastes, when taken alone, and if applicable, with any linked profiles e.g. followed profiles. Data taken from other social media providers, e.g. FourSquare™, may provide greater detail as to which places the user has previously visited and when. For example, such data may include "check-ins", indicating that the user has visited a particular place, such as a restaurant, at a particular time of day. This data may enable a pattern to be inferred as to the user's typical behaviour e.g. that they like to visit a cafe for brunch in the mid-morning at the weekends.

The ensemble ranker 16 compares the featurized description of each POI to the featurized Facebook™ and Twitter™ data for the user, to obtain a score indicative of how good the match is. Separate scores may be assigned for Twitter™ and Facebook™, or a single score may be assigned based upon all user personalisation data. For example, where the POI is a science centre, the featurized POI description may include terms such as "science", "museum", etc. A score indicative of a good match may be assigned where the user's Facebook™ profile includes posts including keywords such as "science", or "technology", or indicates that the user's educational background is scientific, or where the user "likes" a number of science related organisations. The way in which the featurized POI and user personalisation data may be compared will be described in greater detail below.

The ensemble ranker 14 also has a number of other inputs. These inputs are used to obtain further respective scores as to how appropriate a POI may be for recommendation, based on other factors, not generally user specific. The POI distance component 40 determines the distance of the POI from the route, and assigns a score indicative of this. POIs closer to the route will be assigned a more advantageous score than those further from the route. This may help to differentiate between different branches of a chain, so that the closer branch will be more likely to be recommended.

The TA ranking component 42 and the TA rating component 44 are used to provide scores for a POI indicative of a quality of the POI. The TA ranking component 42 uses the TripAdvisor™ ranking to provide a score for the POI. POIs with higher rankings may be provided with a more advantageous score. Suitable normalisation of the ranking may be used, e.g. by dividing by the total number of attractions present in the relevant ranking list. The TA rating component 44 provides a score for the POI based upon its TripAdvisor™ rating, i.e. 1-5 stars. The TA rating is normalised by dividing by 5. Of course, other sources of POI quality data may alternatively or additionally be used.

The various scores obtained based on POI distance, quality and degree of matching to the user personalisation data are combined with particular weights to provide an overall score per POI. The weights may be preset. It is envisaged that the weights may be adjusted based on feedback provided through the user profile 54 and the profiler 56 as described below.

Of course, additional factors may be used to provide a contribution to the score for a particular POI, if desired. In some preferred embodiments, the score assigned to a POI has some temporal dependence. It is recognised that certain types of POI will be more relevant at some times of day than others. For example, a bar will be of more interest in the evening. The server may determine the time that the user will reach the search area when travelling along the route, e.g. when they will reach the waypoint associated with the search area, and may then adjust scores assigned to the POI based on the time of arrival for the search area containing the POI, or may, if appropriate, exclude certain POI. For example, pubs may be excluded if they are likely to be reached in the morning, or any POI that is expected to be closed when the search area is traversed may be excluded. The POI description may include opening time information. The time dependence may be personalised to the particular user using the user personalisation data. For example, the personalisation data may show that a user likes to visit cafes that serve brunch between 10.30 am and 12 pm at weekends. If a search area containing such a POI is expected to be traversed at this time, the POI may be given a more favourable score.

Once each POI identified in the search area has been assigned an overall score by the ensemble ranker 16, the POIs are sorted by score by the sorter 46, to provide each POI with a rank within the set of identified POIs. Those with the highest rank have been found to be most suitable for recommendation to the user. A predetermined number of the highest ranked POIs for the search area, e.g. 10, are then selected for inclusion in the personalised POI recommendation—step 11. This is carried out by the limiter 48. The number of POI to be included in the recommendation may be preset, or may be specified by a user. A user specified number of POI may be communicated to the server as part of the request 12. The limiter may be further arranged to limit the number of POI suggestions provided per category.

Data is then generated indicative of the personalised POI recommendation for the user—step 13. This is carried out by the recommendation component 50. Steps 7, 9, 11 and 13 are carried out in respect of each defined search area (which may be performed sequentially or concurrently), to provide a set of POIs to be recommended for each area. The personalised POI recommendation generated in step 13 may contain the recommendations for all areas, and need not contain data indicative of the search areas themselves. The search areas are used to facilitate obtaining the POI recommendations, and to allow ranking parameters to be varied between different search areas. However, the output to the user will simply show all of the POIs along the route to be traversed, and the search areas used to obtain these are immaterial. The generated POI recommendation data is then transmitted to the device that requested it. The device may then display the POI to the user together with a representation of the route as the user traverses the route. The device may already have independently generated the route prior to the POI recommendation request being sent to the server, or may generate the route during or after generation and/or receiving of the POI recommendation. In other arrangements, it is envisaged that the route may not be independently generated by the device, and the server might transmit data indicative of the route to the device.

The server includes a feedback component 52. This component receives data from the device indicative of the user's behaviour when traversing the route. This will show which POI the user ignored, which the user selected to obtain further information, and which the user actually visited. The user may have requested rerouting in order to be able to visit a POI. For the visited POIs it may be seen how far the user was prepared to deviate from the route to visit POIs, or, more specifically, particular categories of POI. This feedback is used to update a user profile 54 for the user. Other feedback may be provided directly by the user, e.g. by the user providing an input to rate a particular POI, or by directly inputting a preference as to what type of POI they wish to see, how far they will travel to visit a type of POI, etc. This profile will contain information as to the preferences of the user, either input directly by the user, or inferred from their past behaviour.

Data from the user profile 54 is provided to the profiler 56 to enable it to be taken into account by the ensemble ranker 16. Thus, feedback obtained relating to previously generated personalised POI recommendations may be used in generating subsequent ones. The data may be used to adjust the weights assigned to scores in respect of certain factors contributing to the overall score of a POI used in ranking the POI. For example, the weights assigned to quality of the POI may be 0.3, that for POI distance 0.2, and similarity to the user personalisation data 0.6. If the user profile indicates that the user does not like to deviate very far from their route to visit a POI, the weight assigned to POI distance may be increased to 0.4, with each of the other factors being reduced by 0.1. It will be understood that each of these weights are merely exemplary, and any values can be utilised in the method as desired. The user profile data may also be used to adjust scores of particular categories of POI of particular interest to a user, e.g. so that museums have a higher score to increase their likelihood of being recommended, where it is found that the user nearly always visits such POI when recommended.

In the example given above, multiple search areas are defined along the route. This has the advantage that ranking parameters, i.e. parameters used to score POI in relation to different factors and/or the weights applied to different scores to obtain an overall score used in ranking, may be set independently for each area. One example given above is the ability to more easily provide results that are time dependent, based upon the expected time of traversal of the individual areas. Another factor which may be used to vary ranking parameters between the search areas is distance along the route. Depending upon how close the user is to the destination, certain POI are likely to be of greater interest than others. For example, near the destination, hotels may be of greater interest. The ranking parameters may be adjusted such that hotels will be given a relatively more favourable score when a search area is within a given distance of the destination, or is the final search area to be traversed etc.

Of course, in other exemplary embodiments, a single search area may be defined, e.g. a corridor extending along the entire length of the route, or a single area based on a waypoint close to the destination. In addition, rather than being defined based upon a point location, e.g. waypoint, a search area, may, whether one or more search area is defined, be defined in another way, e.g. as a corridor along at least a portion of the route.

Figure 7:
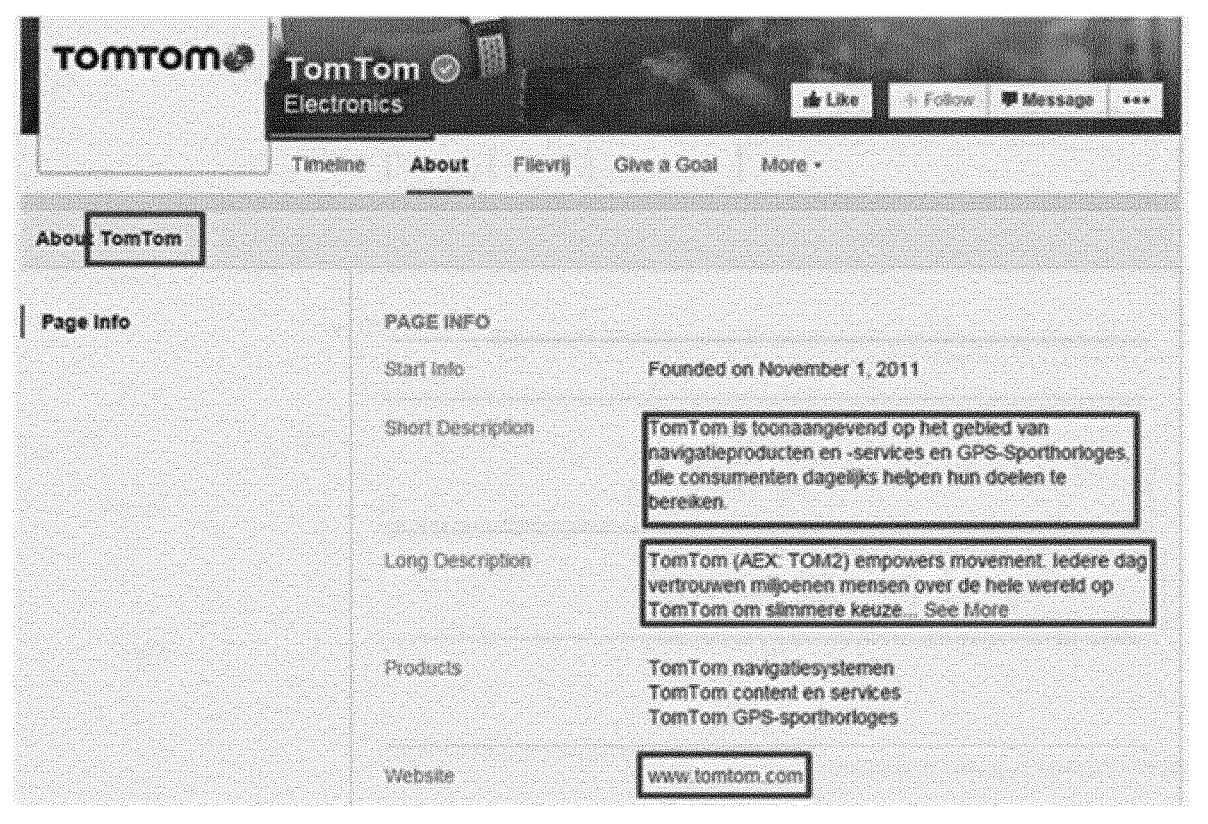
Figure 8:
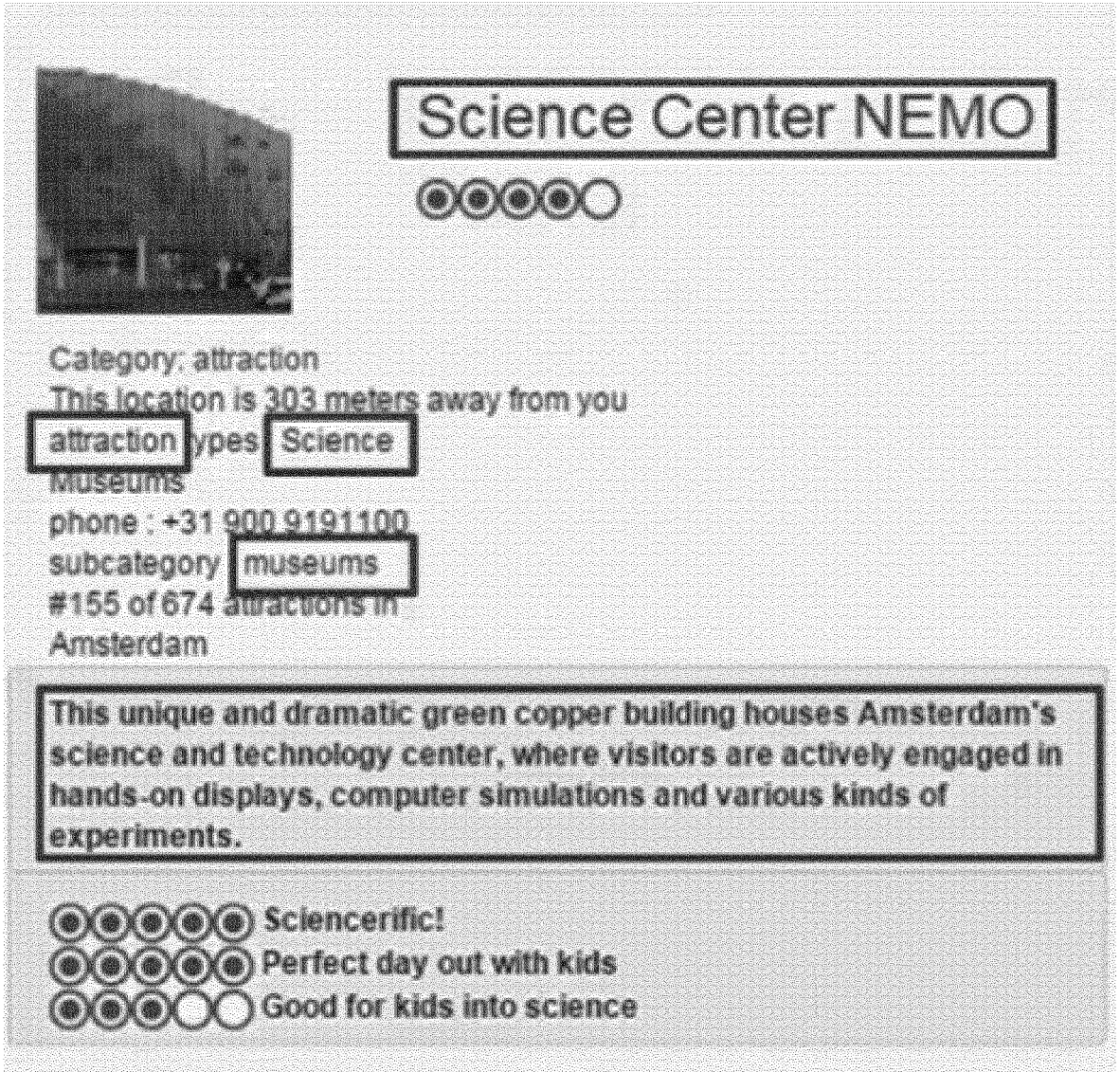
FIG. 8 is a screenshot of a page for an attraction, e.g. from a website such as TripAdvisor™, showing data that may be used to compare it to the social media profile of a user.

Some more detail as to how the user personalisation data and the POI descriptions may be compared and matched to one another will now be given by reference to FIGS. 7 and 8. FIG. 7 is an exemplary Facebook™ profile. The fields which have been ringed include keywords which may usefully be compared to keywords in a POI description to see how well the sets of data match. FIG. 8 is a description of a POI, in this case taken from TripAdvisor™, where text that may yield useful keywords has again been ringed.

Text present in the user personalisation data and the POI description, e.g. on a Facebook™ profile and a TripAdvisor™ page as shown in FIGS. 7 and 8, may be compared in various manners. These typically involve looking for matching keywords present in relevant text in the user profile and POI description. One technique that has been found to be useful is to determine a cosine similarity between the profile and description. This is a technique commonly used by search engines when ranking web pages. Nonetheless, other techniques may be used, including, by way of example and not limitation, manual category and sub-category mapping, automatic category matching based on Normalised Google™ Distance, or a similar approach using another search engine, or a technique based on term frequency-inverse document frequency (TF-IDF), or any combination of such techniques.

In one example, where it is desired to match user personalisation data in the form of a Facebook™ page to a POI description in the form of a TripAdvisor™ page, the Facebook™ page p and TripAdvisor™ POI page q may be taken as vectors expressed in a common feature space, with components for every keyword. A user's Facebook™ profile u can then be expressed as the sum of all vectors of the user's liked Facebook™ pages. Then the similarity between u and q is determined using the cosine similarity measure. This is carried out for every POI identified for the relevant search area, so that the POI may be assigned a score allowing them to be ranked according to the degree they match the user's profile.

In order to match the Facebook™ page and TripAdvisor™ page for a POI in this way, it is necessary to express the Facebook™ page and the TripAdvisor™ page in a common feature space. This may be achieved by matching the Facebook™ page categories and the TripAdvisor™ POI category and subcategory keywords. A mapping is needed from Facebook™ page categories to TripAdvisor™ POI category and subcategory keywords. Alternatively, a mapping may be determined from keyword pairs to a score indicating the extent to which they are similar. The former mapping can be transformed into the latter mapping as follows: if x maps to y then (x,y) can be mapped to 1, otherwise it maps to 0. In order to match Facebook™ page categories to TripAdvisor™ POI category and subcategory keywords, and therefore measure the similarity between keywords from the two different data set, manual mapping may be used or automated mapping using a search engine.

An alternative approach to expressing the Facebook™ page and TripAdvisor™ POI page in a common feature space would use TF-IDF. The Facebook™ page and TripAdvisor™ POI page are both expressed as documents (i.e. collections of words), which are transformed by a sanitizer, a tokenizer, and a stemmer into a feature space. In this feature space, the value of each component is the frequency at which the token occurs in the document. The TF-IDF matrix is fitted to the transformed documents of the TripAdvisor™ POI page. Now the similarity of the Facebook™ page can be compared to the TripAdvisor™ POI page by transforming it by the TF-IDF matrix. The components of the resulting vector are the cosine similarities for the Facebook™ page with the TA POI page. The vector may include components in respect of the cosine similarity between the Facebook™ page and each TA POI page. These can be used directly as set out above to match the Facebook™ page to the TripAdvisor™ POI pages.

The way in which POIs may be displayed to a user by a device using received personalised POI recommendation data generated in accordance with the above described methods will now be described by reference to FIGS. 9 to 11.

Figure 9:
FIG. 9 shows a set of POIs which may be generated within a search area for recommendation to a user based on personalisation data in accordance with the invention.

FIG. 9 illustrates one exemplary display that may be provided to a user. Such a display may be provided via any desired user device, such as a PND, computer, or smartphone. The display includes a region 60 showing a representation of an electronic map of a region. On the right hand side of the electronic map, there are a number of further regions of the display. At the top is a region 62 including various options which may be selected by a user to provide settings included in the request sent to the server, and used in defining the search areas along a route to be traversed. These settings include sliders allowing the waypoint spacing, the radius of the search areas, and the maximum number of recommended POIs to be provided per waypoint, i.e. per search area to be set by the user. Above these sliders is a button which can be used to activate the personalisation functionality. Below the request settings is a panel 64 showing that a connection to the user's Facebook™ profile is enabled. This includes bars indicating the user's preferences for activities and attractions as derived from the profile, e.g. "adventure activities" and "activities sightseeing tours". A bottom panel 66 lists the POI in the illustrated search area by rank, i.e. in order of the rank determined by the server taking into account user personalisation data and other factors, such as distance. As can be seen, the highest ranked POI is the "Central Library", followed respectively by the museum "Our Lord in the Attic" and the sightseeing "Jewish Amsterdam Tour". These POI may be selected to obtain further information about the POI, i.e. to access the TripAdvisor™ page for the POI. By way of illustration, one search area 68 is indicated superposed on the map 60, which includes ten POI in accordance with the "maximum results per waypoint" setting. The POI within this search area are marked with icons 70, which also indicate that these are POI obtained from TripAdvisor™ and that the POI are attractions.

Figure 10:
FIG. 10 illustrates a set of POIs which are generated for the same search area as FIG. 9 when personalisation data is not taken into account.

FIG. 10 illustrates a display similar to that shown in FIG. 9, but showing the impact of turning off the personalisation of POI recommendations based upon the user's Facebook™ profile through the option in panel 62. Here the POIs are provided using a conventional, non-personalised method. It may be seen that of the ten POI shown in the search area 68, half are now restaurants (e.g. see icon 72). In contrast, in the FIG. 9 example, the user's Facebook™ profile reveals an interest in activities and attractions, and the resulting POIs that are displayed are biased towards such types of POI, including more cultural types of POI. For example, the two highest ranked POI are respectively the restaurants "Café Piazza and "Van Beeren".

Figure 11:
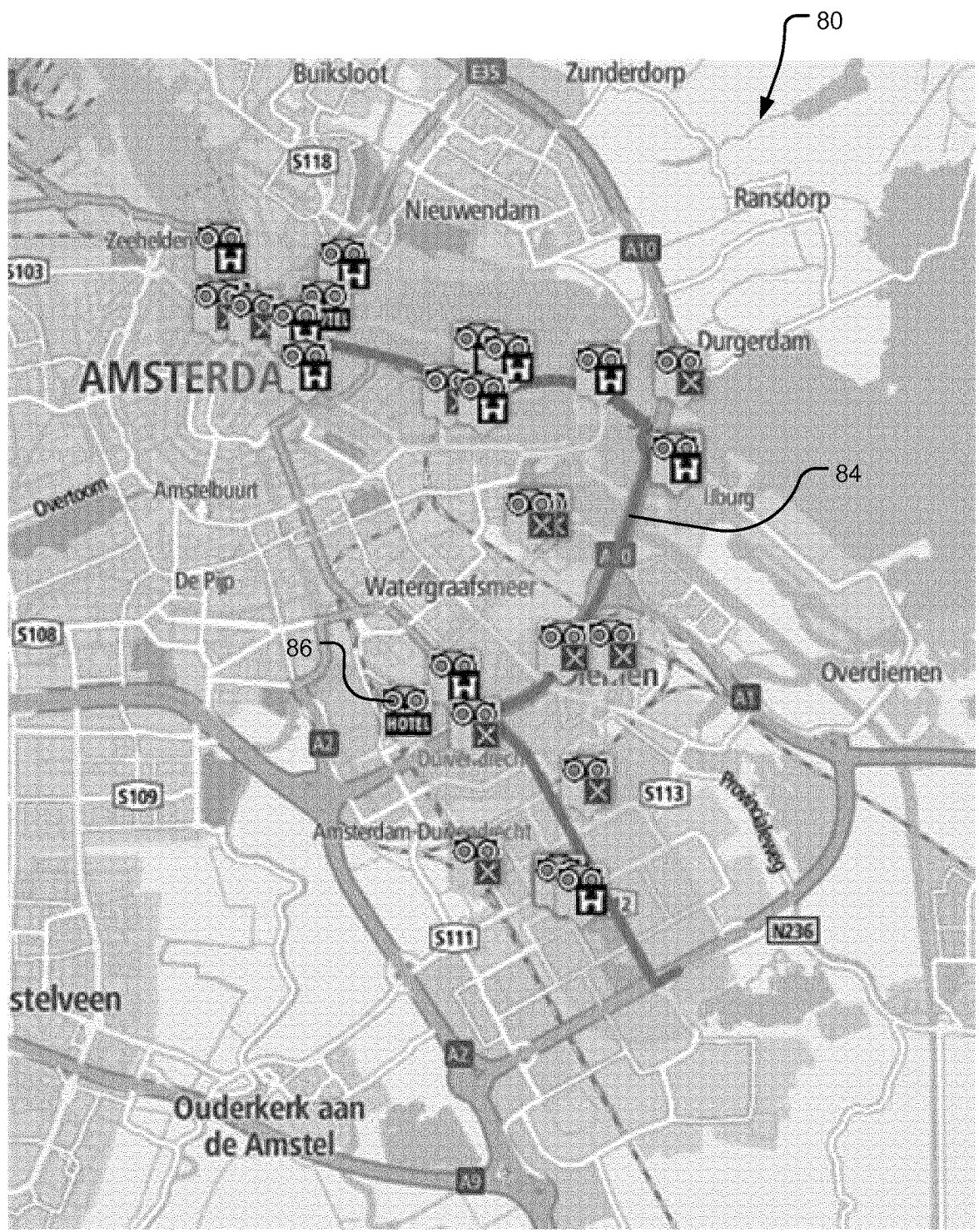
FIG. 11 illustrates a display showing a set of personalised recommended POIs along a route obtained in accordance with the invention.

FIG. 11 illustrates how the POI recommendations generated for multiple search areas along a route may be combined to provide an indication of all POI selected for recommendation to a user along the route. This display is similar to that shown in FIGS. 9 and 10, and includes a display region 80 including a representation of an electronic map, and a panel 82 showing the waypoint spacing has been set to 2 km, with the radius of each search area centred on a waypoint being 1 km, and that four POI are displayed per waypoint, i.e. per search area. In the map area 80, the route 84 to be traversed is indicated, and icons indicative of the POIs 86 selected for recommendation to the user are shown. As the search areas were set to have a radius of 1 km, the POI will all be within 1 km of the route. The search areas associated with the POIs are not expressly represented to the user in this embodiment, although it is possible to do so if desired.

Figure 12:
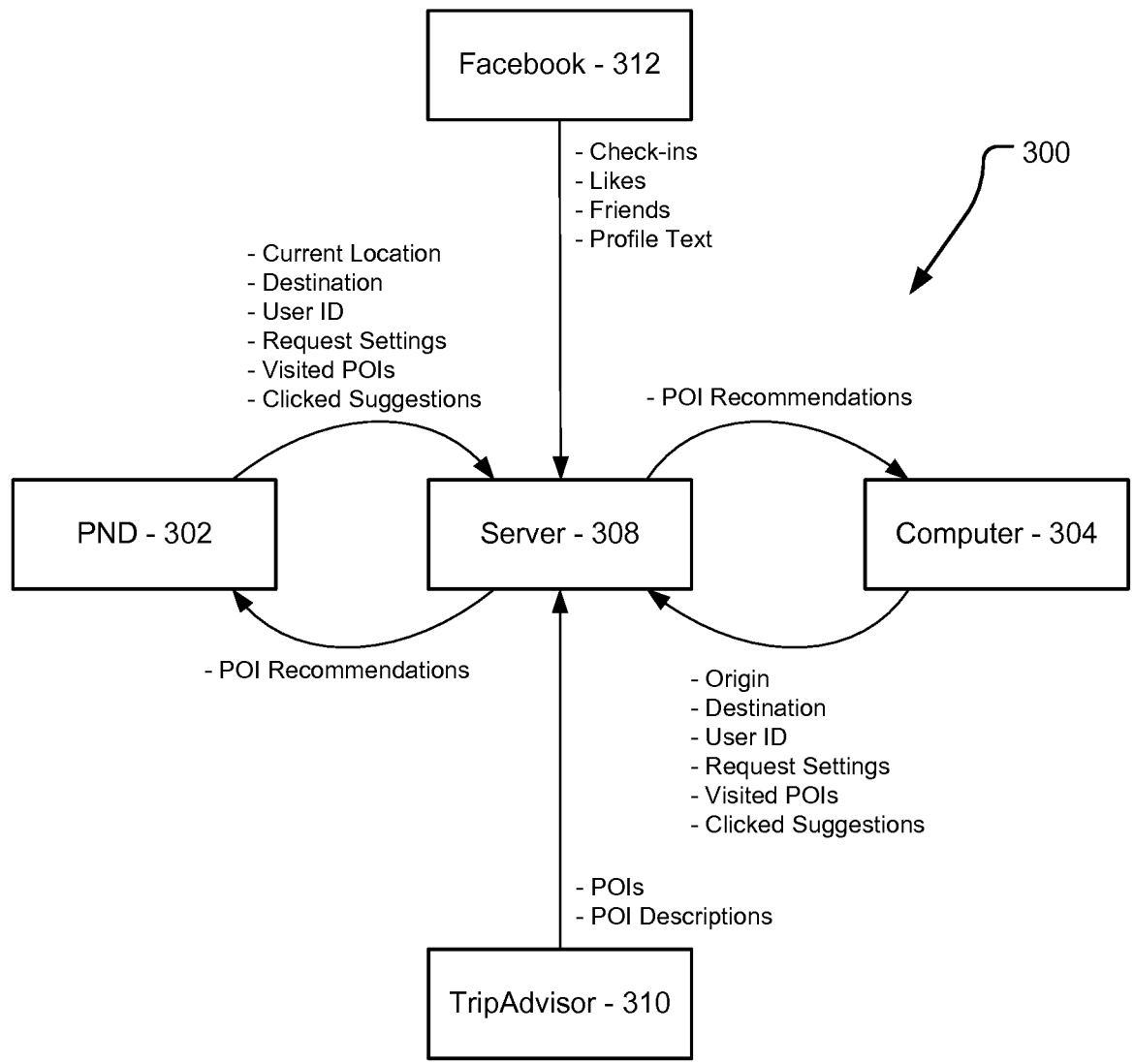
FIG. 12 illustrates a system which may be used to implement the methods of the present invention in some embodiments.

FIG. 12 illustrates one exemplary system 300 for providing personalised POI recommendations, including a server 308 which performs the steps described by reference to FIGS. 5 and 6. The system 300 also includes various user devices in two way communication with the server 308. The set of user devices include a portable navigation device (PND) 302, which can be a smartphone running a navigation app, a dedicated navigation device, or an embedded device in a vehicle running navigation software. In all instances the PND 302 includes location determining means, such as a global navigation satellite system (GNSS) receiver, allowing the current location of the device to be determined. The set of user devices also include a computer 304, such as a home computer or a smartphone, that can use a web browser software application to access an online route planner. The server is also in communication with one or more external sources of user personalisation data, in this case Facebook™ 312, and an external source of POI data, here TripAdvisor™ 310. In use, data indicative of the destination and current location associated with a route can be sent from the user devices 302 and 304 to the server 308. Other data flowing from the user devices to the server 308 includes can user ID and request settings, such as search area size, waypoint spacing, etc. These items of data are needed by the server to generate personalised POI recommendations. It will be appreciated that more than one device may be associated with the same user. In some embodiments, a device ID may be provided from the relevant device to an intermediate user information server, which may then look up the applicable user ID associated with the device, and pass that on to the server 308. All data provided from the user devices to the server 308 may pass first through the user information server. The user information server may also obtain a token from Facebook™ which may be passed to the server to allow Facebook™ data relating to the relevant user to be accessed. In addition, feedback data flows from the user devices to the server 308, to be used in building the user profile of the server. Such data includes data indicative of visited POIs, clicked suggestions, i.e. suggested POIs that the user has shown an interest in, and any directly provided user feedback, such as POI ratings. The server uses this information as described in relation to FIGS. 5 and 6, together with data obtained from Facebook™ and TripAdvisor™ to generate personalised POI recommendations. Data provided from Facebook™ to the server for use in generating recommendations may include "check-ins", i.e. data indicative of visits of certain types of place by the user, "likes", Friends, and profile text. Data indicative of POIs and their associated descriptions is provided from TripAdvisor™ 310 to the server 308. In turn, the server 308 provides personalised POI recommendations to each of the user devices 302 and 304 when requested.

Of course, rather than being implemented by a server as in the above described embodiments, the method of the present invention may be implemented entirely by a user device, such as a PND, computer or smartphone. The user device may be arranged to communication with sources of user personalisation data, e.g. Facebook™, Twitter™, etc. and sources of POI data, e.g. TripAdvisor™, in order to generate personalised POI recommendations, in the same manner as the server in the earlier embodiments.

Figure 13A:
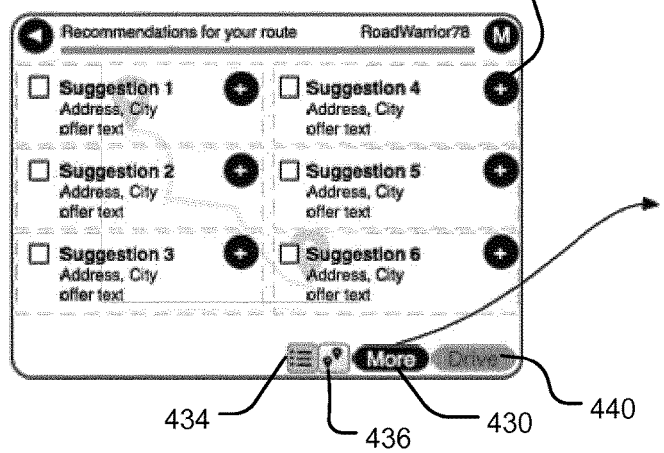
FIGS. 13a, 13b and 13c illustrate various displays which may be presented to a user using personalised POI recommendations obtained in accordance with the invention.
Figure 13B:
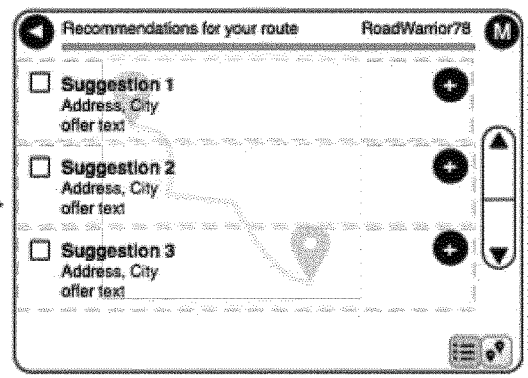
Figure 13C:
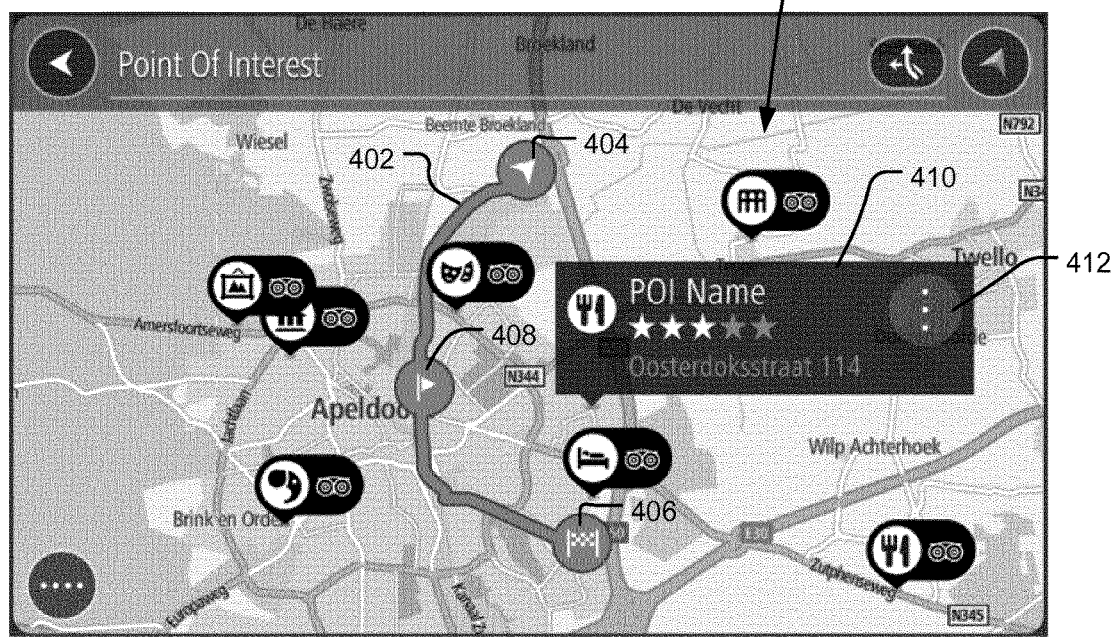

FIGS. 13a, 13b and 13c illustrate the way in which personalised POI recommendations may be provided to a user by a PND, whether received from a server, or generated by the PND itself. The PND first generates a route from a current location to a given destination. The personalised POI recommendations for the route are then obtained for the user, whether by the PND itself, or by the PND providing the necessary information to a server, with the server then providing the recommendations to the PND as in the system illustrated in FIG. 12. In this example, the PND has requested for POI recommendations to be provided for the calculated route to the destination. The received POI recommendations can be presented to the user in the form of a list, as shown in FIG. 13a. The number of recommendations displayed may be limited, e.g. to 6 to 8,to ensure that they easily fit into the display. The display includes a "more" button 430, which may be selected by the user to allow any further recommendations to be displayed in a new window; see FIG. 13b. For each POI the name and address of the POI is given, and a button 432 is provided which may be selected by the user to allow further details about the POI to be seen. Each POI suggestion may be associated with an icon to allow the user to readily identify its category. A rating for the POI may be given. When the user taps the drive button 440, the suggestion windows will be closed, and the user will be presented with a display for guiding the user along the route. Two further buttons, the list view button 434 and the map view button 436 allow the user to toggle the display between the list view shown in FIGS. 13a and 13b, and a map view, showing at least some and possibly all of the recommended POIs on a map.

When the user taps one of the suggestions shown in FIG. 13a or 13b, whether in the overview form shown, or after selecting a button 432 to obtain further details, the suggested POI will be shown superposed on a map, with a box (similar to box 410 shown in FIG. 13c) providing more information about the POI. If the user then selects the POI, this is taken as an indication that they wish to visit the POI, with the result that the POI replaces the previous destination of the route, prompting calculation of a new route to allow the user to visit the POI. It is envisaged that where multiple POIs are selected by the user to be visited, an itinerary may be planned, visiting the selected POIs as waypoints before continuing to the existing destination, e.g. in the order that the POIs were selected by the user. If the user does not select a POI in this way, the existing route remains the active route, and the user may exit the suggestions menu to return to a guidance display for guiding the user along the active route.

FIG. 13c is an example of a display that may be provided to the user, once the user has selected a drive mode, i.e. has finished browsing suggestions, and selecting suggested POI to be visited if appropriate. The display includes an electronic map, upon which a route 402 is superposed, extending between a current position 404 and a destination 406, and travelling via a waypoint 408. Icons 410 indicative of various recommended POI are shown indicating the locations of the POI. These are all in proximity to the route. Each icon 410 includes an indication of the type of POI, e.g. museum, theatre, hotel, etc, and its source, e.g. TripAdvisor™. If the user wishes to find out more about a POI, they may tap the icon to open up a box e.g. box 410, including the name, type of attraction, location and rating. The box also includes a button 412 which the user may tap to obtain further information about the location, e.g. all available information.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of generating a personalised recommendation of at least one point of interest (POI) for a user, the method comprising:
receiving a request for a personalized POI recommendation for the user, the request including data indicative of settings for defining a plurality of search areas on a route through a navigable network, the data indicative of the settings including at least one of a predetermined size of each search area and a spacing of point locations along the route at which the plurality of search areas are to be based;
obtaining user personalisation data indicating preferences of the user;
defining the plurality of search areas based on the route and the data indicative of the settings, wherein each search area is based on a different point location along the route;
assigning a set of ranking parameters for each search area based on the user personalisation data and at least one of a distance of the search area along the route and an expected time of traversal of the search area, wherein the ranking parameters include a plurality of factors for which an individual score will be determined and a plurality of weights providing the contribution of each individual score to an overall score;
for each search area:
identifying a plurality of POIs present within the search area;
obtaining descriptive data relating to attributes of each of the identified POIs;
comparing the user personalisation data and the descriptive data for each identified POI in the search area to determine a score based on a degree to which the attributes of the respective POI matches the preferences of the user as indicated by the user personalisation data;
determining one or more additional scores for each identified POI according to the assigned set of ranking parameters for the search area;
determining an overall score for each identified POI by combining the determined score and one or more additional scores using the weights according to the assigned set of ranking parameters for the search area; and
ranking the POIs identified in each or all of the search areas based on the determined overall scores;
selecting one or more of the identified POIs for inclusion in a personalised POI recommendation for the user based on the determined ranking or rankings;
generating the personalized POI recommendation for the user comprising data indicative of the selected one or more identified POIs; and
presenting, on a display, an indication of one or more POIs from the personalised POI recommendation in association with the route or a portion of the route.

2. The method of claim 1, wherein the one or more additional scores comprise one or more of: a score based on a distance between the POI and the route; and a score based on a quality of the POI.

3. The method of claim 1, wherein at least one of the user personalisation data and the descriptive data relating to attributes of each of the identified POIs is obtained from one or more third party web sites.

4. The method of claim 1, wherein the user personalisation data comprises data obtained from one or more social media profiles of the user.

5. The method of claim 1, wherein the plurality of POIs identified as being present in the search area correspond to all POIs determined to be present in the search area.

6. The method of claim 1, wherein the score is based on a similarity between text contained in the user personalisation data and the descriptive data.

7. The method of claim 1, comprising using the generated personalised POI recommendation to display to the user an indication of each one of the one or more identified POIs.

8. The method of claim 1, wherein the descriptive data for a given POI comprises one or more webpages relating to the POI.

9. The method of claim 1, wherein one or more of the set of ranking parameters are time dependent.

10. The method of claim 9, wherein time dependency of the ranking parameters is based upon the user personalisation data.

11. The method of claim 1, further comprising obtaining user feedback in relation to the POIs included in the generated personalised POI recommendation, and using the feedback to adjust the ranking parameters used to generate a subsequent personalised POI recommendation for the user.

12. The method of claim 1, wherein selecting the subset of the POIs in the general POI listing includes:
ranking the POIs in the general POI listing relative to one another using the overall scores for the POIs; and
including only a specified number of top ranked POIs from the general POI listing in the personalised POI listing.

13. The method of claim 1, wherein the weights for each search area are individually set based on one or more properties of that search area so that values for each weight can be different for different search areas.

14. The method of claim 1, wherein selecting the one or more of the identified POIs for inclusion in the personalised POI recommendation includes:
collating a general POI listing that includes POIs from each or all of the search areas; and
selecting a subset of the POIs in the general POI listing for inclusion in the personalised POI listing based on the POIs present in the general POI listing.

15. A system for generating a personalised recommendation of at least one point of interest (POI) for a user, the system comprising one or more processors arranged to:
receive a request for a personalized POI recommendation for the user, the request including data indicative of settings for defining a plurality of search areas on a route through a navigable network, the data indicative of the settings including at least one of a predetermined size of each search area and a spacing of point locations along the route at which the plurality of search areas are to be based;
obtain user personalisation data indicating preferences of the user;
define the plurality of search areas based on the route and the data indicative of the settings, wherein each search area is based on a different point location along the route;
assign a set of ranking parameters for each search area based on the user personalisation data and at least one of a distance of the search area along the route and an expected time of traversal of the search area, wherein the ranking parameters include a plurality of factors for which an individual score will be determined and a plurality of weights providing the contribution of each individual score to an overall score;

for each search area:
  identify a plurality of POIs present within the search area;
  obtain descriptive data relating to attributes of each of the identified POIs;
  compare the user personalisation data and the descriptive data for each identified POI in the search area to determine a score based on a degree to which the attributes of the respective POI matches the preferences of the user as indicated by the user personalisation data;
  determine one or more additional scores for each identified POI according to the assigned set of ranking parameters for the search area;
  determine an overall score for each identified POI by combining the determined score and one or more additional scores using the weights according to the assigned set of ranking parameters for the search area; and
  rank the POIs identified in each or all of the search areas based on the determined overall scores;
select one or more of the identified POIs for inclusion in a personalised POI recommendation for the user based on the determined ranking or rankings;
generate the personalised POI recommendation for the user comprising data indicative of the selected one or more identified POIs; and
present, on a display, an indication of one or more POIs from the personalised POI recommendation in association with the route or a portion of the route.

16. The system of claim 15, wherein the one or more additional scores comprise one or more of: a score based on a distance between the POI and the route; and a score based on a quality of the POI.

17. The system of claim 15, wherein at least one of the user personalisation data and the descriptive data relating to attributes of each of the identified POIs is obtained from one or more third party web sites.

18. The system of claim 15, wherein the user personalisation data comprises data obtained from one or more social media profiles of the user.

19. The system of claim 15, wherein the plurality of POIs identified as being present in the search area correspond to all POIs determined to be present in the search area.

20. The system of claim 15, wherein the score is based on a similarity between text contained in the user personalisation data and the descriptive data.

21. A non-transitory computer readable medium storing instructions which, when executed by at least one processor of a computing device, cause the computing device to perform a method of generating a personalised recommendation of at least one point of interest (POI) for a user, the method comprising:

receiving a request for a personalized POI recommendation for the user, the request including data indicative of settings for defining a plurality of search areas on a route through a navigable network, the data indicative of the settings including at least one of a predetermined size of each search area and a spacing of point locations along the route at which the plurality of search areas are to be based;
obtaining user personalisation data indicating preferences of the user;
defining the plurality of search areas based on the route and the data indicative of the settings, wherein each search area is based on a different point location along the route;
assigning a set of ranking parameters for each search area based on the user personalisation data and at least one of a distance of the search area along the route and an expected time of traversal of the search area, wherein the ranking parameters include a plurality of factors for which an individual score will be determined and a plurality of weights providing the contribution of each individual score to an overall score;
for each search area:
  identifying a plurality of POIs present within the search area;
  obtaining descriptive data relating to attributes of each of the identified POIs;
  comparing the user personalisation data and the descriptive data for each identified POI in the search area to determine a score based on a degree to which the attributes of the respective POI matches the preferences of the user as indicated by the user personalisation data;
  determining one or more additional scores for each identified POI according to the assigned set of ranking parameters for the search area;
  determining an overall score for each identified POI by combining the determined score and one or more additional scores using the weights according to the assigned set of ranking parameters for the search area; and
  ranking the POIs identified in each or all of the search areas based on the determined overall scores;
selecting one or more of the identified POIs for inclusion in a personalised POI recommendation for the user based on the determined ranking or rankings;
generating the personalized POI recommendation for the user comprising data indicative of the selected one or more identified POIs; and
presenting, on a display, an indication of one or more POIs from the personalised POI recommendation in association with the route or a portion of the route.

* * * * *